(12) United States Patent
Hirakawa et al.

(10) Patent No.: US 12,523,808 B2
(45) Date of Patent: Jan. 13, 2026

(54) OPTICAL MEMBER AND IMAGING APPARATUS

(71) Applicant: FUJIFILM Corporation, Tokyo (JP)

(72) Inventors: Yuya Hirakawa, Saitama (JP);
Kazuyoshi Okada, Saitama (JP);
Yasunobu Kishine, Saitama (JP);
Atsushi Kawanago, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 363 days.

(21) Appl. No.: 18/189,170

(22) Filed: Mar. 23, 2023

(65) Prior Publication Data

US 2023/0258851 A1    Aug. 17, 2023

Related U.S. Application Data

(63) Continuation of application No. PCT/JP2021/034968, filed on Sep. 24, 2021.

(30) Foreign Application Priority Data

Sep. 29, 2020   (JP) ................................. 2020-163230

(51) Int. Cl.
*G02B 5/20*     (2006.01)
*G02B 5/30*     (2006.01)
*G03B 11/00*    (2021.01)

(52) U.S. Cl.
CPC .......... *G02B 5/203* (2013.01); *G02B 5/3025* (2013.01); *G03B 11/00* (2013.01)

(58) Field of Classification Search
None
See application file for complete search history.

(56) References Cited

U.S. PATENT DOCUMENTS 9,395,516 B2   7/2016   Katsunuma et al.
9,625,789 B2   4/2017   Katsunuma et al.
(Continued)

FOREIGN PATENT DOCUMENTS

DE   102017130024   6/2019
JP   H0273340      3/1990
(Continued)

OTHER PUBLICATIONS

"Office Action of Japan Counterpart Application", issued on Jun. 12, 2024, with English translation thereof, pp. 1-6.
(Continued)

*Primary Examiner* — Derek S. Chapel
(74) *Attorney, Agent, or Firm* — JCIPRNET

(57) ABSTRACT

There are provided an optical member and an imaging apparatus. An optical member includes a plurality of aperture regions which transmit a ray of an optical system and include a first aperture region and a second aperture region and of which the first aperture region and the second aperture region are adjacent to each other, a plurality of optical filters disposed in the first aperture region and the second aperture region transmit light having at least a part of wavelength ranges different from each other, a plurality of polarizing filters disposed in the first aperture region and the second aperture region have polarization directions different from each other, and a ray incidence-reduction part that reduces incidence of a ray, which is incident on the first aperture region, on at least one of the optical filter or the polarizing filter disposed in the second aperture region.

12 Claims, 39 Drawing Sheets

(56) References Cited

U.S. PATENT DOCUMENTS

| | | | | |
|---|---|---|---|---|
| 12,356,059 B2* | 7/2025 | Hirakawa | .............. | G03B 17/14 |
| 2009/0021675 A1 | 1/2009 | Kishioka et al. | | |
| 2015/0192758 A1* | 7/2015 | Yamagata | ............ | G02B 5/3025 |
| | | | | 348/360 |
| 2015/0349030 A1* | 12/2015 | Ono | ..................... | H10K 50/844 |
| | | | | 257/40 |
| 2018/0113570 A1* | 4/2018 | Kim | ......................... | G02B 5/20 |
| 2021/0333151 A1 | 10/2021 | Miyata et al. | | |

FOREIGN PATENT DOCUMENTS

| | | |
|---|---|---|
| JP | H0273341 | 3/1990 |
| JP | 2001091748 | 4/2001 |
| JP | 2002023107 | 1/2002 |
| JP | 2004201203 | 7/2004 |
| JP | 2012204387 | 10/2012 |
| JP | 2012247644 | 12/2012 |
| JP | 2012247645 | 12/2012 |
| JP | 2016127512 | 7/2016 |
| JP | 2019220852 | 12/2019 |
| JP | 2020051868 | 4/2020 |
| WO | 2013179620 | 12/2013 |

OTHER PUBLICATIONS

"International Search Report (Form PCT/ISA/210) of PCT/JP2021/034968", mailed on Dec. 14, 2021, with English translation thereof, pp. 1-5.

"Written Opinion of The International Searching Authority (Form PCT/ISA/237) of PCT/JP2021/034968", mailed on Dec. 14, 2021, with English translation thereof, pp. 1-6.

"Office Action of China Counterpart Application", issued on May 19, 2025, with English translation thereof, p. 1-p. 20.

"Office Action of China Counterpart Application", issued on Sep. 11, 2025, with English translation thereof, p. 1- p. 10.

* cited by examiner

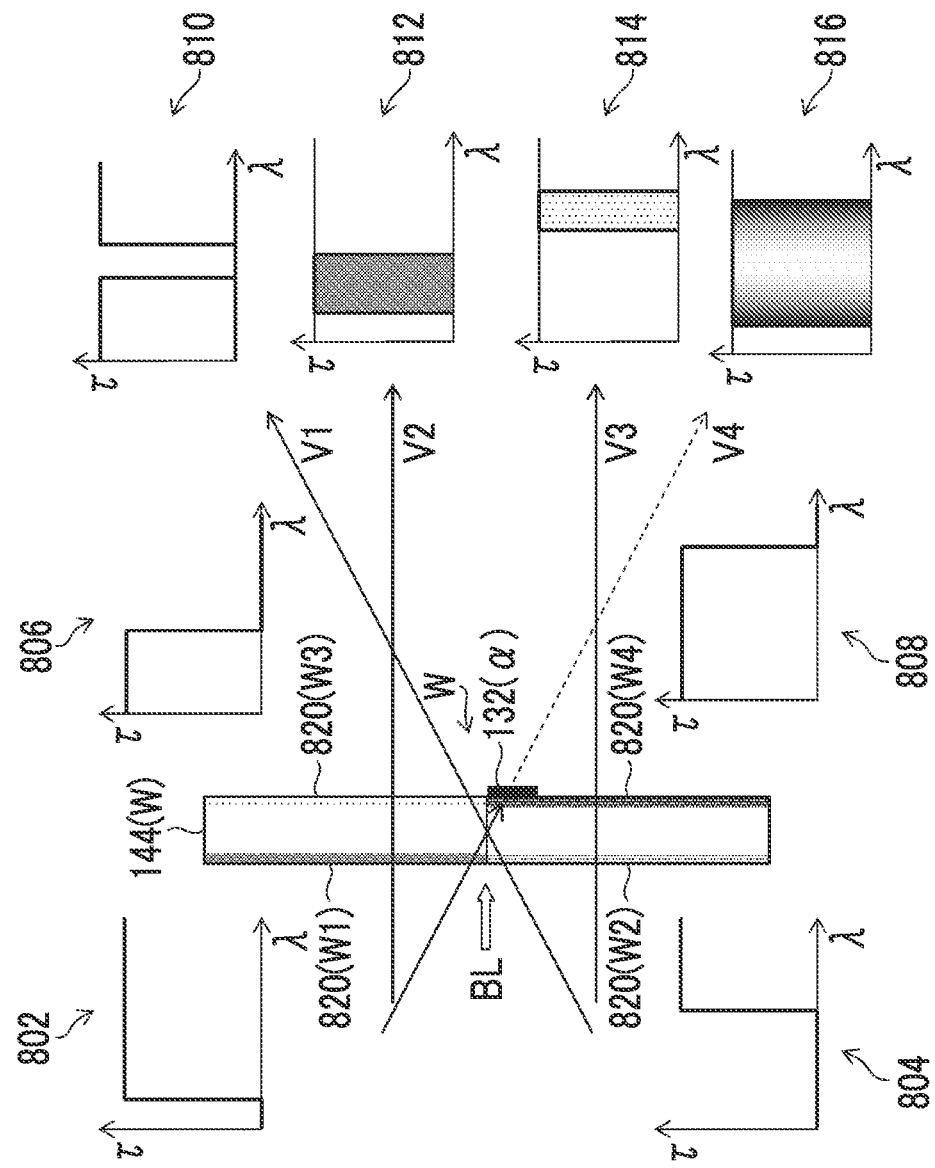

OPTICAL MEMBER AND IMAGING APPARATUS

CROSS-REFERENCE TO RELATED APPLICATIONS

The present application is a Continuation of PCT International Application No. PCT/JP2021/034968 filed on Sep. 24, 2021 claiming priority under 35 U.S.C § 119(a) to Japanese Patent Application No. 2020-163230 filed on Sep. 29, 2020. Each of the above applications is hereby expressly incorporated by reference, in its entirety, into the present application.

BACKGROUND OF THE INVENTION

1. Field of the Invention

The present invention relates to an optical member and an imaging apparatus, and more particularly, to an optical member including a plurality of aperture regions and an imaging apparatus.

2. Description of the Related Art

A technique for simultaneously acquiring a plurality of images having image information different from each other with one imaging is known.

WO2013/179620A discloses an imaging apparatus comprising: a pre-optical system that transmits light from an object; a spectral filter array that transmits light from the pre-optical system via a plurality of spectral filters; a small lens array that transmits light from the plurality of spectral filters via a plurality of small lenses, respectively, to form a plurality of object images; an imaging element that captures the plurality of object images; and an image processing unit that obtains the two-dimensional spectral information of the object images on the basis of image signals output from the imaging element. In the imaging apparatus disclosed in WO2013/179620A, a partition member is disposed between the small lens array and the imaging element.

SUMMARY OF THE INVENTION

An embodiment of according to a technique of the present disclosure provides an optical member including a plurality of aperture regions and an imaging apparatus.

An optical member according to an aspect of the present invention comprises a plurality of aperture regions which transmit a ray of an optical system and include a first aperture region and a second aperture region and of which the first aperture region and the second aperture region are adjacent to each other, a plurality of optical filters that are disposed in the first aperture region and the second aperture region and transmit light having at least a part of wavelength ranges different from each other, a plurality of polarizing filters that are disposed in the first aperture region and the second aperture region and have polarization directions different from each other, and a ray incidence-reduction part that reduces incidence of a ray, which is incident on the first aperture region, on at least one of the optical filter or the polarizing filter disposed in the second aperture region.

Preferably, the ray incidence-reduction part is provided at a boundary portion between the first aperture region and the second aperture region and extends in a direction of an optical axis of the optical system.

Preferably, the ray incidence-reduction part reflects a ray.

Preferably, the ray incidence-reduction part guides reflected light to an object side of the optical system.

Preferably, the ray incidence-reduction part includes a first light shielding portion that is provided at a boundary portion between the first aperture region and the second aperture region and extends in a direction of an optical axis of the optical system, and a second light shielding portion that extends from the boundary portion in a direction along a plane perpendicular to the optical axis.

Preferably, the first light shielding portion has an inclination that reduces a reflection angle of reflected light.

Preferably, the ray incidence-reduction part is provided to extend from a boundary portion between the first aperture region and the second aperture region in a direction along a plane perpendicular to an optical axis of the optical system.

Preferably, the ray incidence-reduction part is provided on a surface of the optical filter or the polarizing filter facing an object side.

Preferably, the ray incidence-reduction part is provided on a surface of the optical filter or the polarizing filter facing an image side.

Preferably, the optical filter and the polarizing filter are provided in close contact with each other.

Preferably, in the optical member, the optical filter and the polarizing filter are provided to be separated from each other, and the ray incidence-reduction part is provided between the optical filter and the polarizing filter to extend in a direction along a plane perpendicular to an optical axis of the optical system and/or in a direction along the optical axis.

Preferably, the optical filter is provided with a first surface transmitting a first wavelength range on an object side of the optical system and a second surface transmitting a second wavelength range on an image side of the optical system in the first aperture region and is provided with a third surface transmitting a third wavelength range on the object side of the optical system and a fourth surface transmitting a fourth wavelength range on the image side of the optical system in the second aperture region, and the ray incidence-reduction part is disposed on the fourth surface in a case where an overlapping range between the first wavelength range and the fourth wavelength range is equal to or larger than a predetermined wavelength range A.

An imaging apparatus according to another aspect of the present invention comprises a lens device in which the above-mentioned optical member is disposed at a pupil position or near the pupil position, a plurality of polarizers that have polarization directions corresponding to the polarization directions of the plurality of polarizing filters, an imaging element that includes a plurality of pixel groups selectively receiving light passing through any of the plurality of aperture regions, and a processor that generates a plurality of images corresponding to the wavelength ranges of the plurality of optical filters, respectively, on the basis of a plurality of image signals output from the imaging element.

BRIEF DESCRIPTION OF THE DRAWINGS

FIG. 41 is a diagram illustrating a ray incidence-reduction part W of an eighth embodiment.

DESCRIPTION OF THE PREFERRED EMBODIMENTS

An optical member and an imaging apparatus according to preferred embodiments of the present invention will be described below with reference to the accompanying drawings.

<Configuration of Imaging Apparatus>

Figure 1:
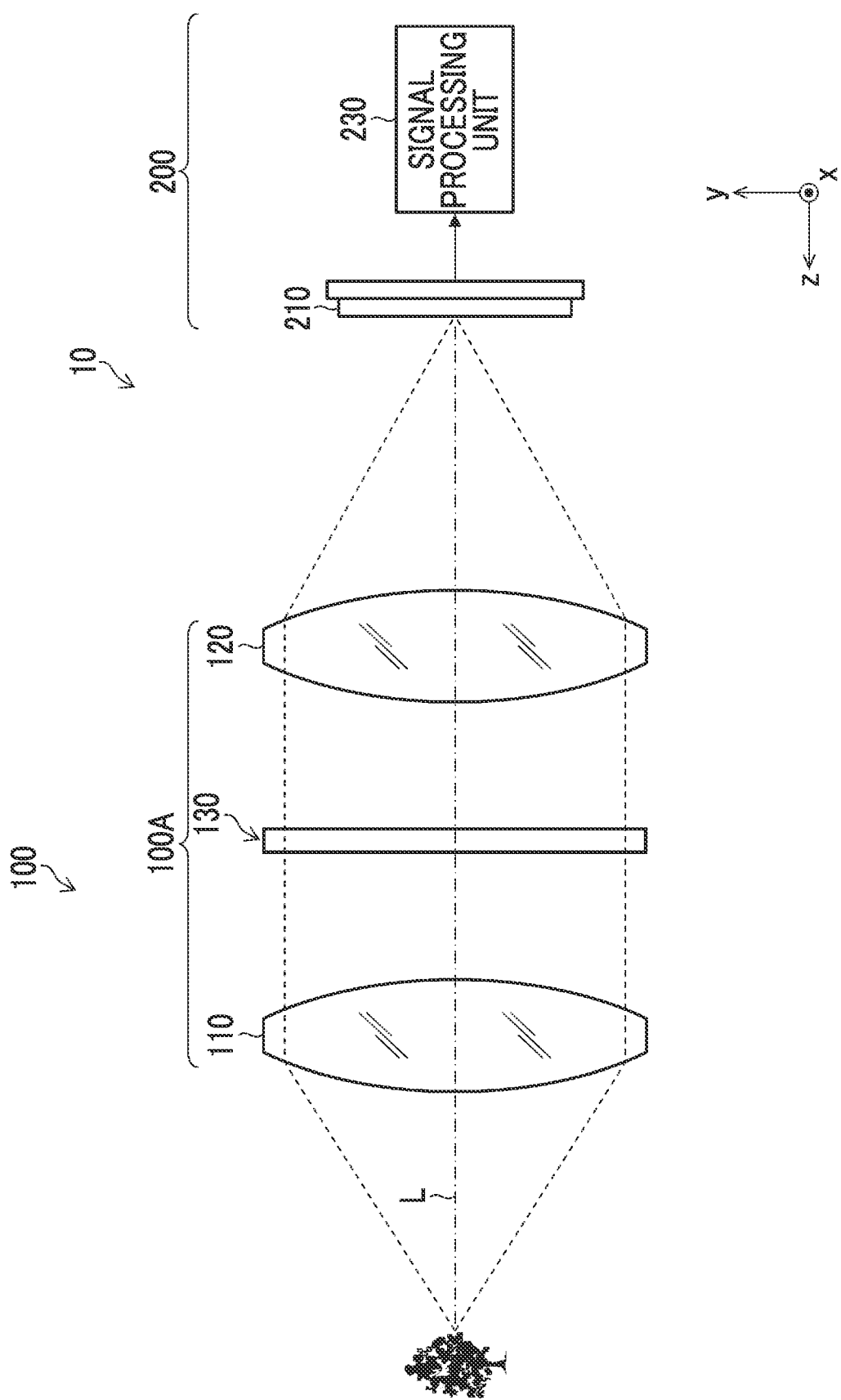
FIG. 1 is a diagram showing a schematic configuration of an imaging apparatus.

FIG. 1 is a diagram showing a schematic configuration of an imaging apparatus on which a lens device including an optical member is mounted. The imaging apparatus 10 is an imaging apparatus (multispectral camera) 10 that captures a multispectral image, and comprises a lens device 100 and an imaging apparatus body 200. The imaging apparatus body 200 comprises an imaging element 210 and a signal processing unit 230. The lens device 100 comprises an optical system 100A that is composed of a first lens 110 and a second lens 120 and an optical member (wavelength polarizing filter unit) 130 that is disposed at a pupil position of the optical system 100A or near the pupil position. In the following description, an object side means a positive side on a Z axis and an image side means a negative side on the Z axis.

<Configuration of Image Generation Unit>

Figure 2:
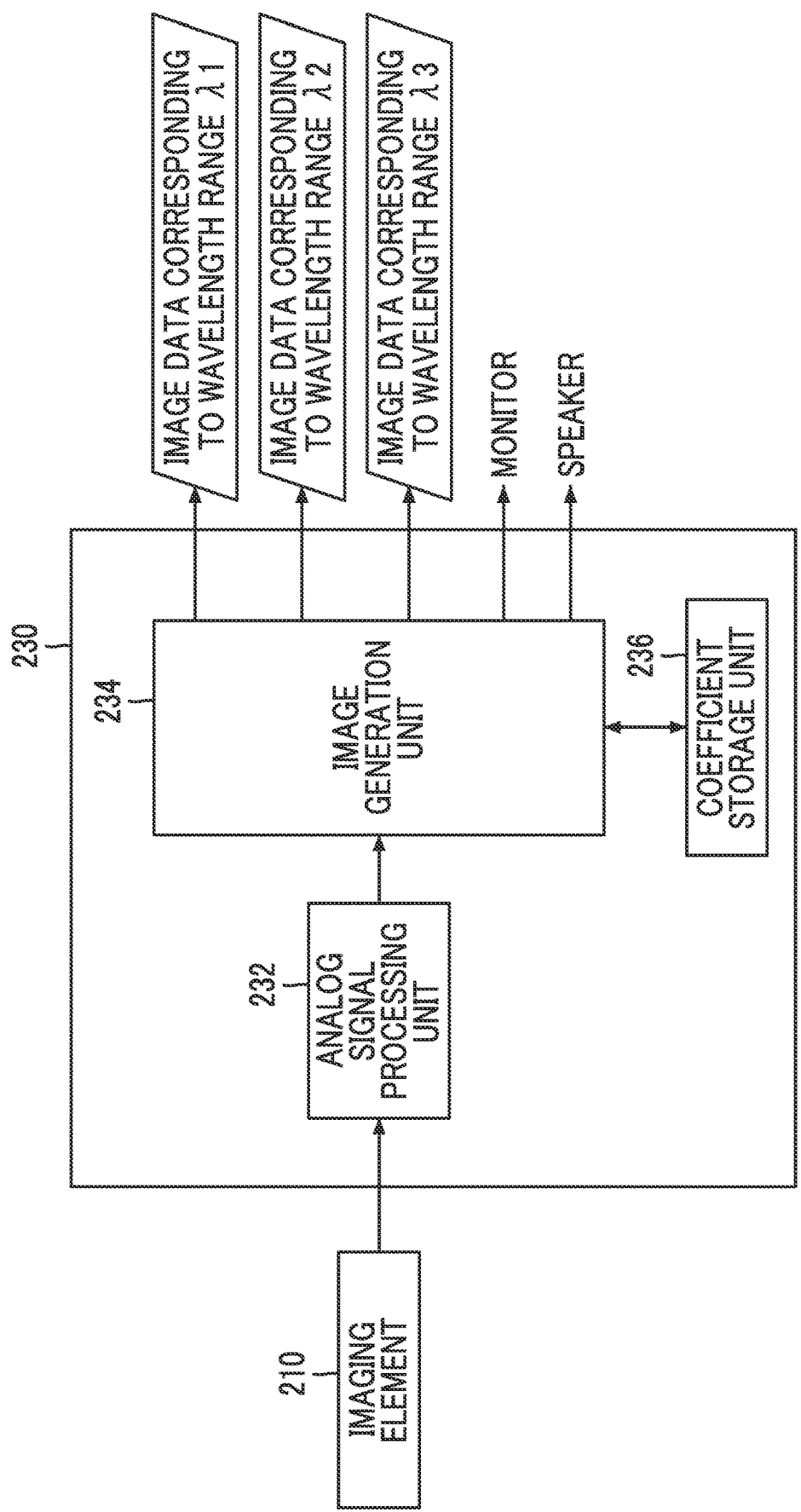
FIG. 2 is a diagram showing a configuration of a signal processing unit.

FIG. 2 is a diagram showing a configuration of the signal processing unit 230. The signal processing unit 230 comprises an analog signal processing unit 232 that performs analog signal processing on signals output from the imaging element 210, an image generation unit 234, and a coefficient storage unit 236. The image generation unit 234 (processor) comprises a non-transitory recording medium (not shown), such as a read only memory (ROM), in which computer readable codes of an imaging program causing a computer to perform an imaging method according to an embodiment of the present invention are recorded, and a transitory storage region (not shown) for work; and generates a plurality of images (spectral images), which correspond to the wavelength ranges of a plurality of optical filters arranged in the optical system 100A, respectively, on the basis of a plurality of image signals output from the imaging element 210 (image signals corresponding to different polarization directions). The image generation unit 234 can generate images (three-band multispectral images) corresponding to wavelength ranges $\lambda 1$, $\lambda 2$, and $\lambda 3$.

The functions of the above-mentioned image generation unit 234 can be realized using various processors and recording mediums. The various processors also include, for example, a central processing unit (CPU) that is a general-purpose processor realizing various functions by executing software (program), a graphics processing unit (GPU) that is a processor specialized in image processing, and a programmable logic device (PLD) that is a processor of which circuit configuration can be changed after manufacture, such as a field programmable gate array (FPGA). Each function may be realized by one processor or may be realized by a plurality of processors of the same type or different types (for example, a plurality of FPGAs, a combination of a CPU and an FPGA, or a combination of a CPU and a GPU).

Further, a plurality of functions may be realized by one processor. The hardware structures of these various processors are more specifically electrical circuitry where circuit elements, such as semiconductor elements, are combined.

In a case where the above-mentioned processors or electrical circuitry executes software (program), codes, which can be read by a computer (for example, various processors or electrical circuitry forming the image generation unit 234, and/or a combination thereof), of the software to be executed are stored in a non-transitory recording medium, such as ROM, and a computer refers to the software.

In a case where the imaging apparatus 10 receives an imaging instruction input from a shutter release switch (not shown) or the like, the imaging apparatus 10 performs the exposure control of the imaging element 210. The optical image of a subject, which is formed on the light-receiving surface of the imaging element 210 by this exposure control, is converted into electrical signals by the imaging element 210. Electric charges corresponding to the amount of light incident on a photodiode 212 (see FIG. 3) are accumulated in each pixel of the imaging element 210, and electrical signals corresponding to the quantity of electric charges accumulated in each pixel are read out as image signals and output from the imaging element 210.

<Configuration of Imaging Element>

Figure 3:
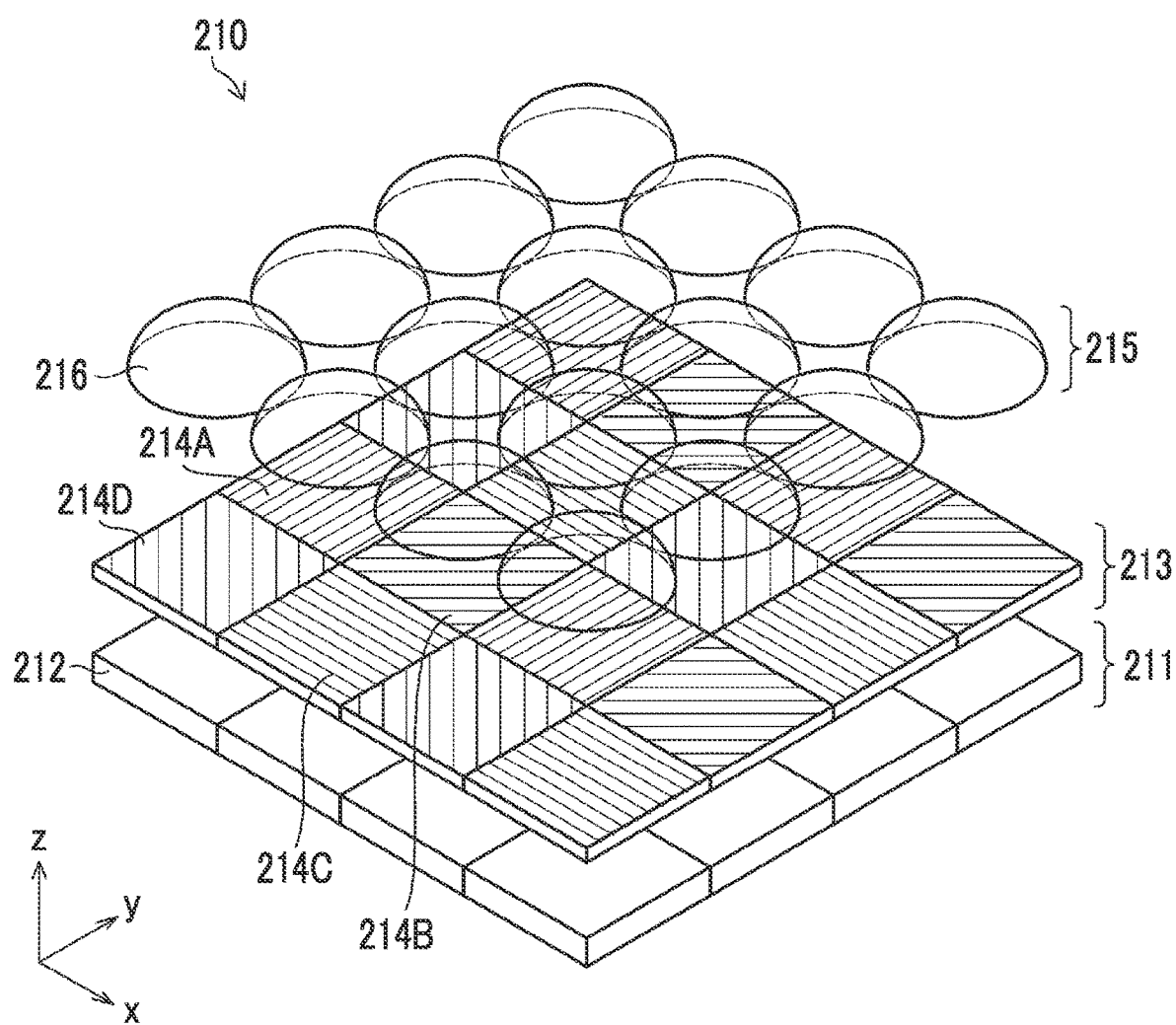
FIG. 3 is a diagram showing a schematic configuration of an imaging element.
Figure 4:
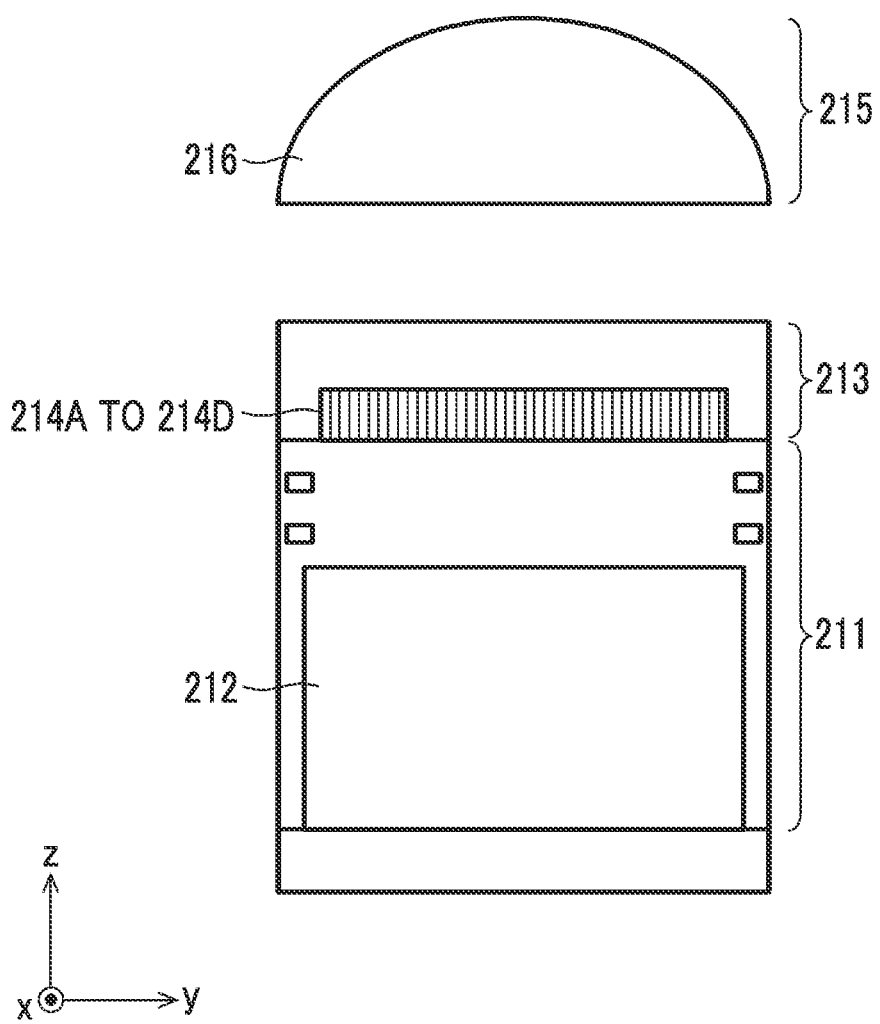
FIG. 4 is a cross-sectional view showing a schematic configuration of one pixel shown in FIG. 3.

FIG. 3 is a diagram showing a schematic configuration of the imaging element 210, and FIG. 4 is a cross-sectional view showing a schematic configuration of one pixel shown in FIG. 3. The imaging element 210 is a complementary metal-oxide semiconductor (CMOS) type imaging element (image sensor), and is a monochrome imaging element that includes a pixel array layer 211, a polarizing filter element-array layer 213, and a microlens array layer 215. The respective layers are arranged in the order of the pixel array layer 211, the polarizing filter element-array layer 213 (a plurality of polarizers), and the microlens array layer 215 from an image (plane) side toward an object side. The imaging element 210 is not limited to a CMOS type image sensor and may be an XY address type image sensor or a charge coupled device (CCD) type image sensor.

The pixel array layer 211 has a configuration in which a lot of photodiodes 212 (a plurality of pixel groups) are two-dimensionally arranged. One photodiode 212 forms one pixel. The respective photodiodes 212 are regularly arranged in a horizontal direction (x direction) and a vertical direction (y direction).

The polarizing filter element-array layer 213 has a configuration in which four types of polarizing filter elements (polarizers) 214A, 214B, 214C, and 214D (a plurality of polarizers) having different polarization directions (the polarization directions of light to be transmitted) are two-dimensionally arranged. The polarization directions of the polarizing filter elements 214A, 214B, 214C, and 214D can be set to, for example, 0°, 45°, 90°, and 135°. Further, these polarization directions can be made to correspond to the polarization directions of polarizing filters 148 (see FIG. 8) of the optical member 130. Due to these polarizing filter elements 214A to 214D, the imaging element 210 includes a plurality of image groups, each of which selectively receives any one of pieces of light transmitted through a plurality of aperture regions. These polarizing filter elements 214A to 214D are arranged at the same intervals as the photodiodes 212, and are provided for pixels, respectively.

The microlens array layer 215 comprises microlenses 216 that are arranged for the respective pixels.

<Configuration of Lens Device>

Figure 5:
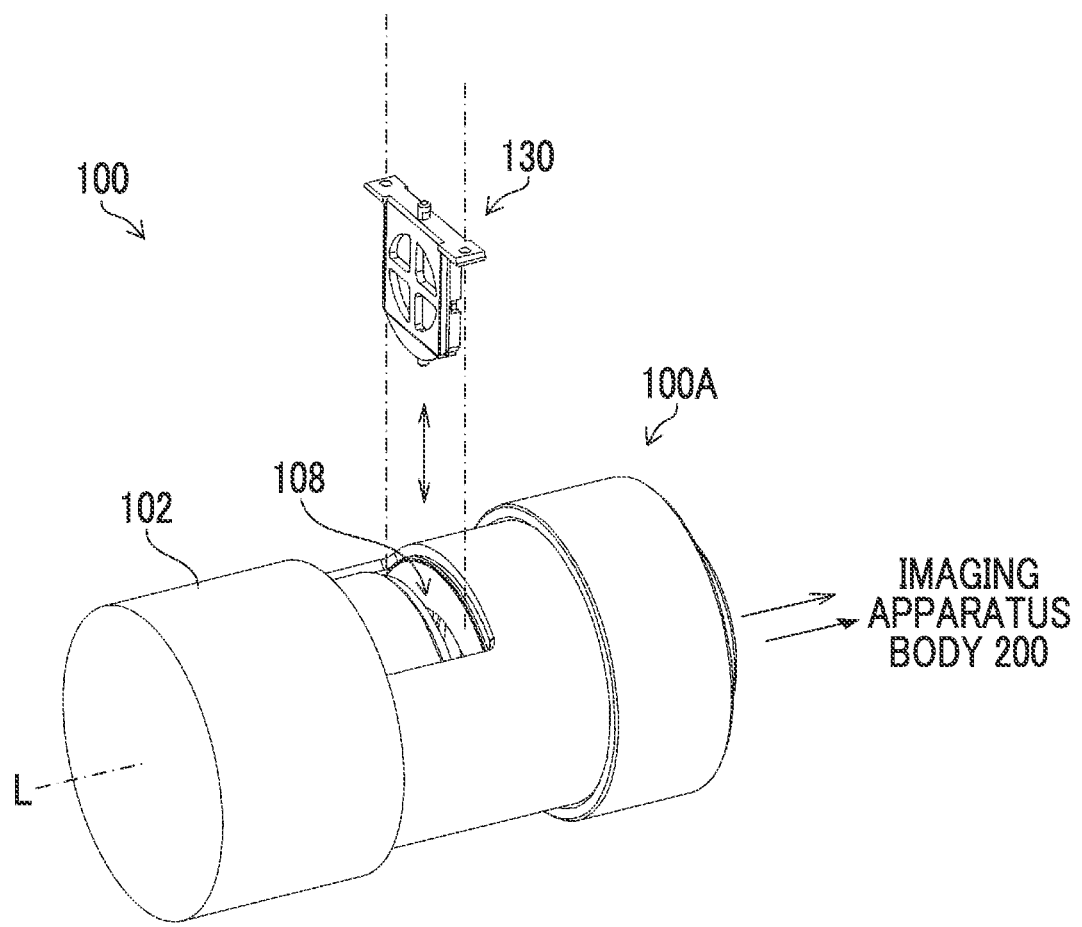
FIG. 5 is an external perspective view of a lens device.
Figure 6:
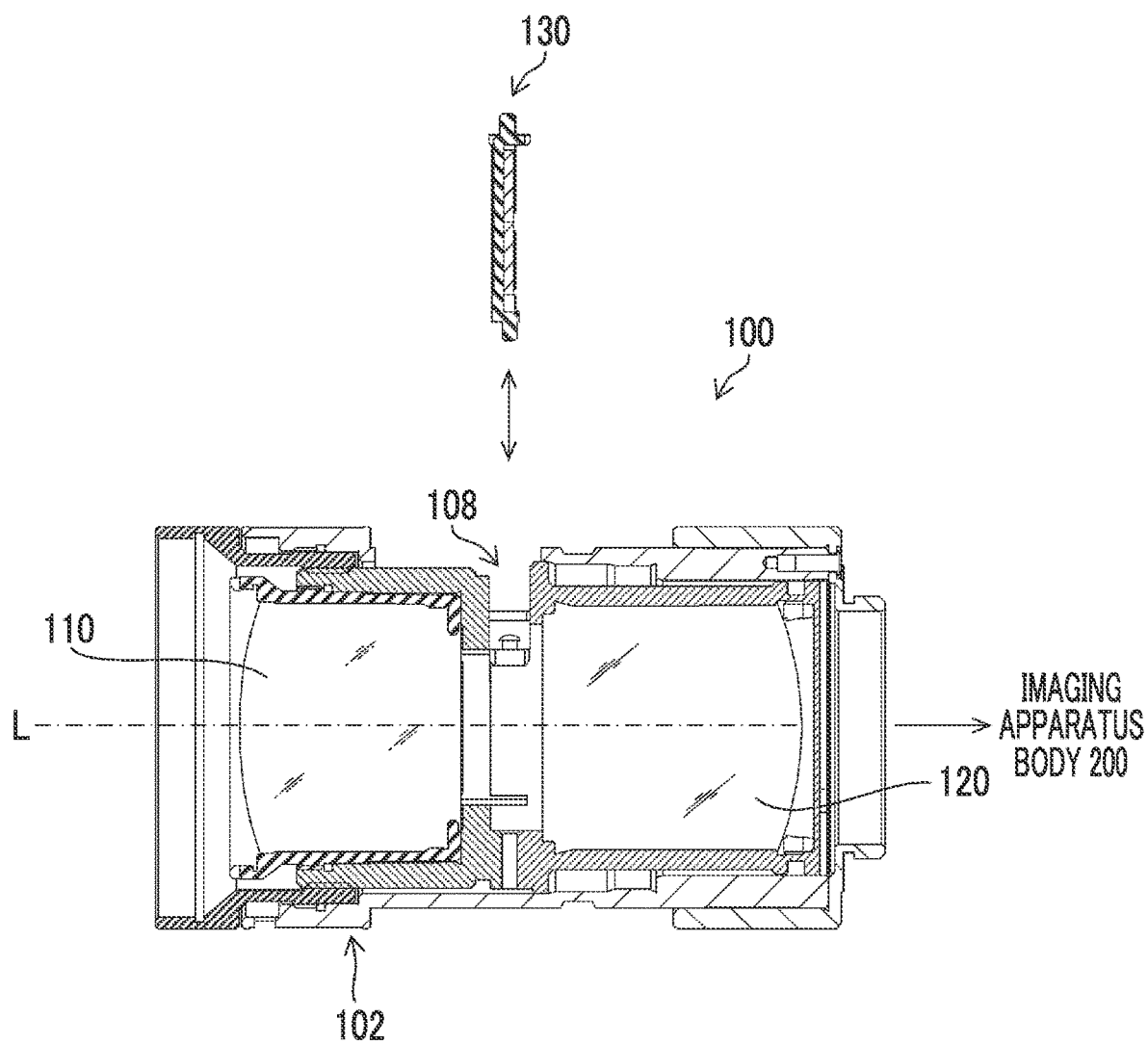
FIG. 6 is a cross-sectional view of the lens device taken in a direction of an optical axis L.

FIG. 5 is an external perspective view of the lens device 100, and FIG. 6 is a cross-sectional view of the lens device 100 taken in the direction of an optical axis L. As shown in FIGS. 5 and 6, a single imaging optical system composed of the first lens 110 and the second lens 120 is disposed in a lens barrel 102 of the lens device 100. Each of the first lens 110 and the second lens 120 may be a lens group composed of a plurality of lenses. Further, a slit 108 is formed in the lens barrel 102 at a pupil position (near the pupil) of the lens device 100, and the optical member 130 is inserted into the slit 108 and is disposed in a state where the optical axis of the optical member 130 coincides with the optical axis L of the imaging optical system.

Figure 7B:
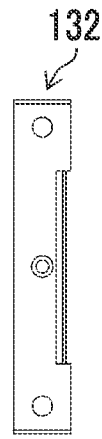
FIGS. 7A to 7F are external views of a frame.
Figure 7E:
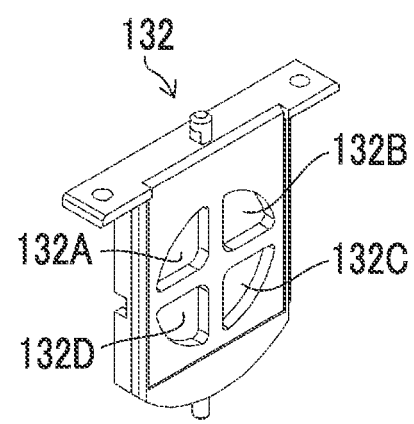
Figure 7A:
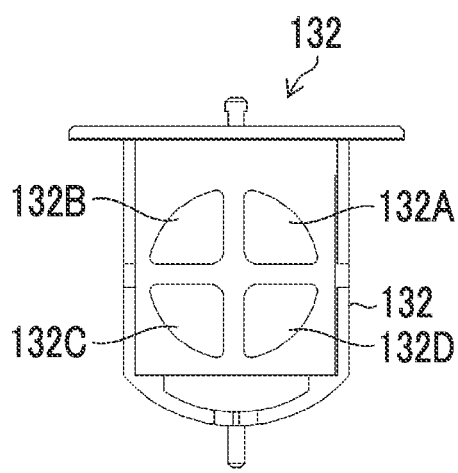
Figure 7C:
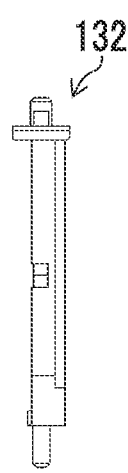
Figure 7F:
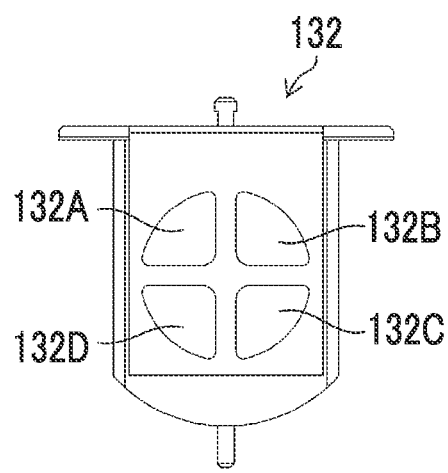
Figure 7D:
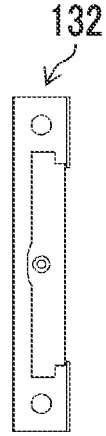
Figure 8:
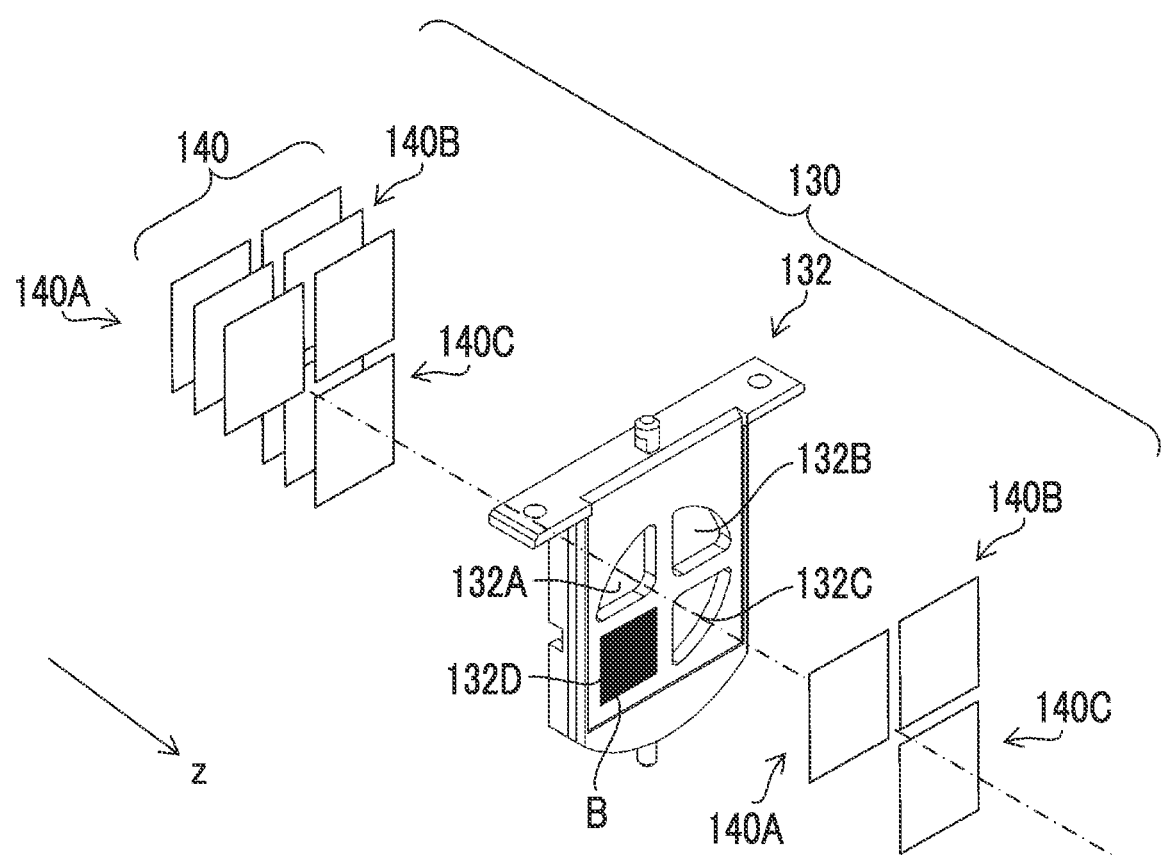
FIG. 8 is a diagram showing a configuration example of an optical member.

FIGS. 7A to 7F are external views of a frame 132, and FIG. 8 is a diagram showing a configuration example of the optical member 130. Specifically, FIGS. 7A to 7F are a back view, a top view, a left side view, a bottom view, a perspective view, and a front view, respectively. As shown in FIGS. 7E and 7F, the frame 132 comprises four aperture regions 132A to 132D. The shape of each of the aperture regions 132A to 132D is not limited to a fan shape, and may be other shapes, such as a circular shape, a rectangular strip shape, a rectangular shape, and a polygonal shape. Since it is sufficient to provide three aperture regions in a case where three images (images corresponding to the wavelength ranges λ1, λ2, and λ3) are to be acquired, the aperture region 132D is shielded from light by a shielding member B as shown in FIG. 8. Further, since the aperture region 132D is shielded from light by the shielding member B in this example, the aperture regions 132A to 132C are available but the present invention is not limited thereto. For example, the shielding member B may not be provided, and an optical filter having the same wavelength range and a polarizing filter having the same polarization direction as any one of the aperture regions 132A to 132C may be disposed in the aperture region 132D.

As shown in FIG. 8, filter sets 140A to 140C (neutral density (ND) filters, optical filters, optical path length-correcting filters, and polarizing filters) are disposed in the three aperture regions (132A to 132C) not shielded from light (on the back side of the frame 132), respectively. A case where each of the filter sets 140A to 140C is formed of four filters is shown in FIG. 8. Further, in each of the filter sets 140A to 140C, a filter (for example, the ND filter) closest to the object side is provided on the surface of the frame 132 facing the object side, and the other three filters (for example, the optical filter, the optical path length-correcting filter, and the polarizing filter) are provided on the surface of the frame 132 facing the image side. The arrangement of the filters and the position of the frame 132 disposed between the filters are not limited to the above-mentioned example, and various aspects are employed.

Figure 9:
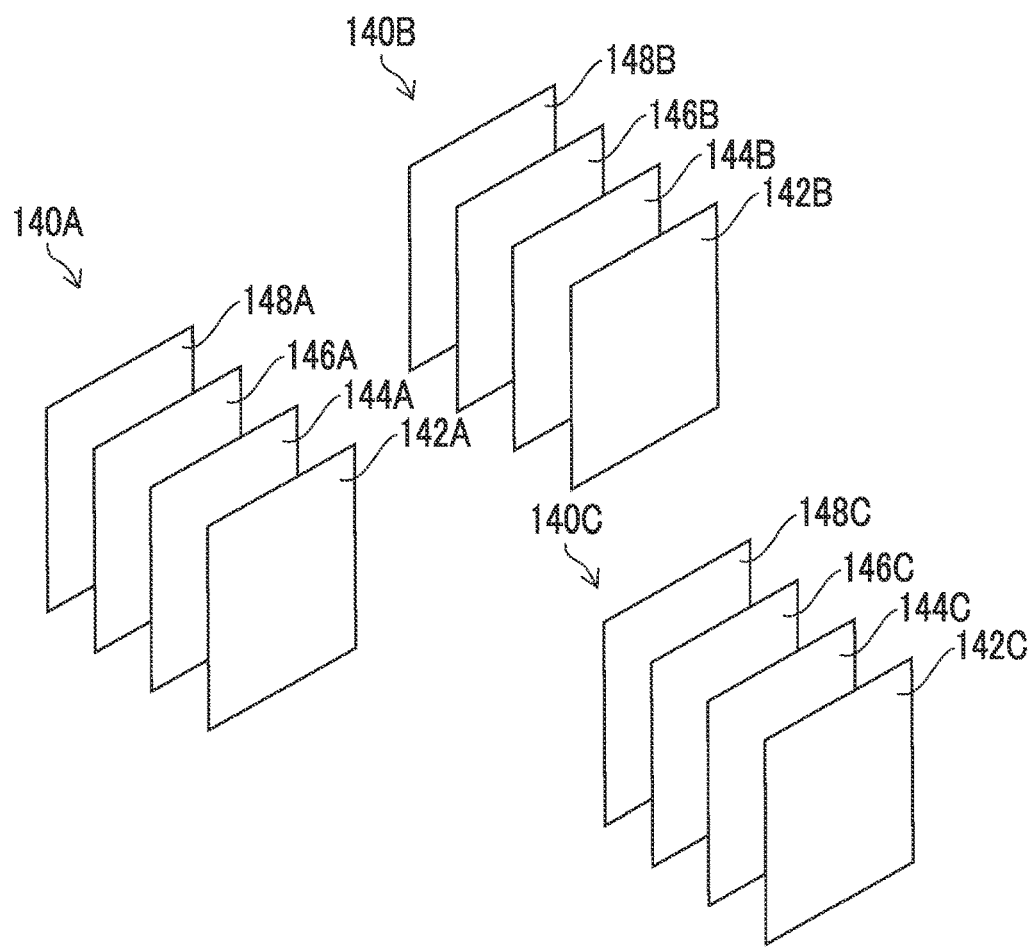
FIG. 9 is a diagram illustrating a configuration of filter sets.

FIG. 9 is a diagram illustrating a configuration of the filter sets 140A to 140C.

The filter set 140A is formed of four different types of filters. The filter set 140A is formed of the ND filter 142A, the optical filter 144A transmitting light having the wavelength range λ1, the optical path length-correcting filter 146A, and the polarizing filter 148A having a polarization direction of 0° that are arranged in order from the object side. Likewise, the filter set 140B is formed of the ND filter 142B, the optical filter 144B transmitting light having the wavelength range λ2, the optical path length-correcting filter 146B, and the polarizing filter 148B having a polarization direction of 60° that are arranged in order from the object side. Likewise, the filter set 140C is also formed of the ND filter 142C, the optical filter 144C transmitting light having the wavelength range λ3, the optical path length-correcting filter 146C, and the polarizing filter 148C having a polarization direction of 120° that are arranged in order from the object side. Since three spectral images, that is, a spectral image corresponding to the wavelength range λ1, a spectral image corresponding to the wavelength range λ2, and a spectral image corresponding to the wavelength range λ3 are acquired in this example, the polarization directions of the polarizing filters 148A to 148C are different from each other. For example, in a case where two spectral images are to be acquired, at least two polarizing filters having polarization directions different from each other are used. Further, a part of the wavelength ranges of λ1, λ2, and λ3 are different from each other.

Figure 10:
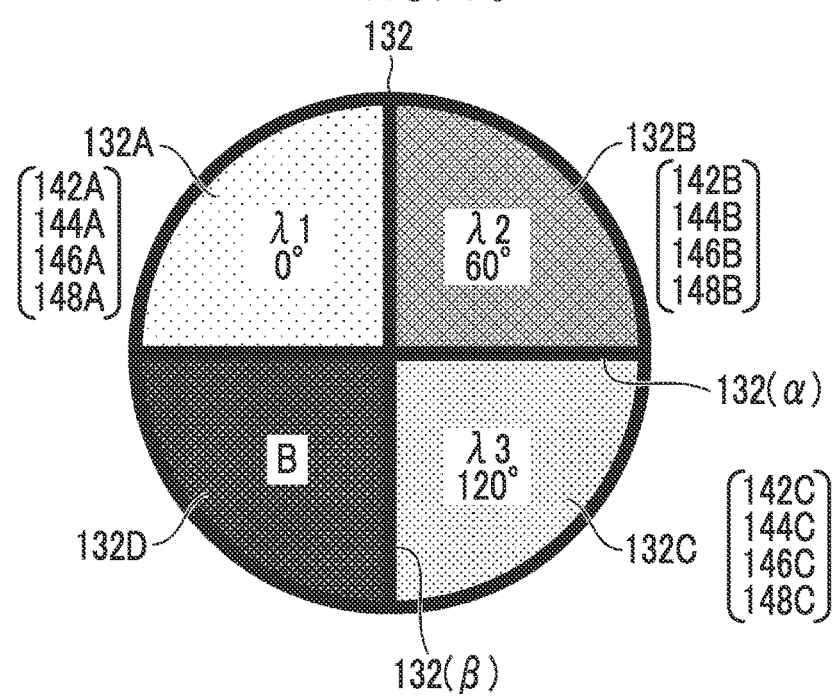
FIG. 10 is a diagram showing a relationship between aperture regions and a filter configuration.

FIG. 10 is a diagram showing a relationship between the aperture regions and a filter configuration.

The optical member 130 includes the aperture regions 132A to 132D formed by the frame 132. Specifically, a region boundary member 132(α) of the frame 132 is disposed at a boundary between the aperture region 132A and the aperture region 132D and between the aperture region 132B and the aperture region 132C, and a region boundary member 132(β) is disposed at a boundary between the aperture region 132A and the aperture region 132B and between the aperture region 132C and the aperture region 132D.

<Suppression of Crosstalk>

As described above, each of the filter sets 140A to 140C is formed of a combination of a plurality of filters. In a case where each of the filter sets 140A to 140C is formed of a plurality of filters as described above, each of the filter sets 140A to 140C itself has a thickness. In a case where each of the filter sets 140A to 140C itself has a thickness, a ray obliquely incident on each aperture region may pass through not only the filter intended for design but also the other filters. For example, a ray obliquely incident on the aperture region 132A may be transmitted through even the filters provided in the aperture region 132B. A phenomenon in which a ray is transmitted across the adjacent aperture regions as described above will be referred to as crosstalk in the following description. In a case where crosstalk occurs, the quality of an image to be obtained and spectral accuracy are affected. Particularly, in a case where a ray causing crosstalk is transmitted through filters significantly affecting image data (the optical filter and the polarizing filter in the above-mentioned example), the quality of an image and spectral accuracy are significantly affected. A specific example in which crosstalk occurs will be described below.

Figure 11:
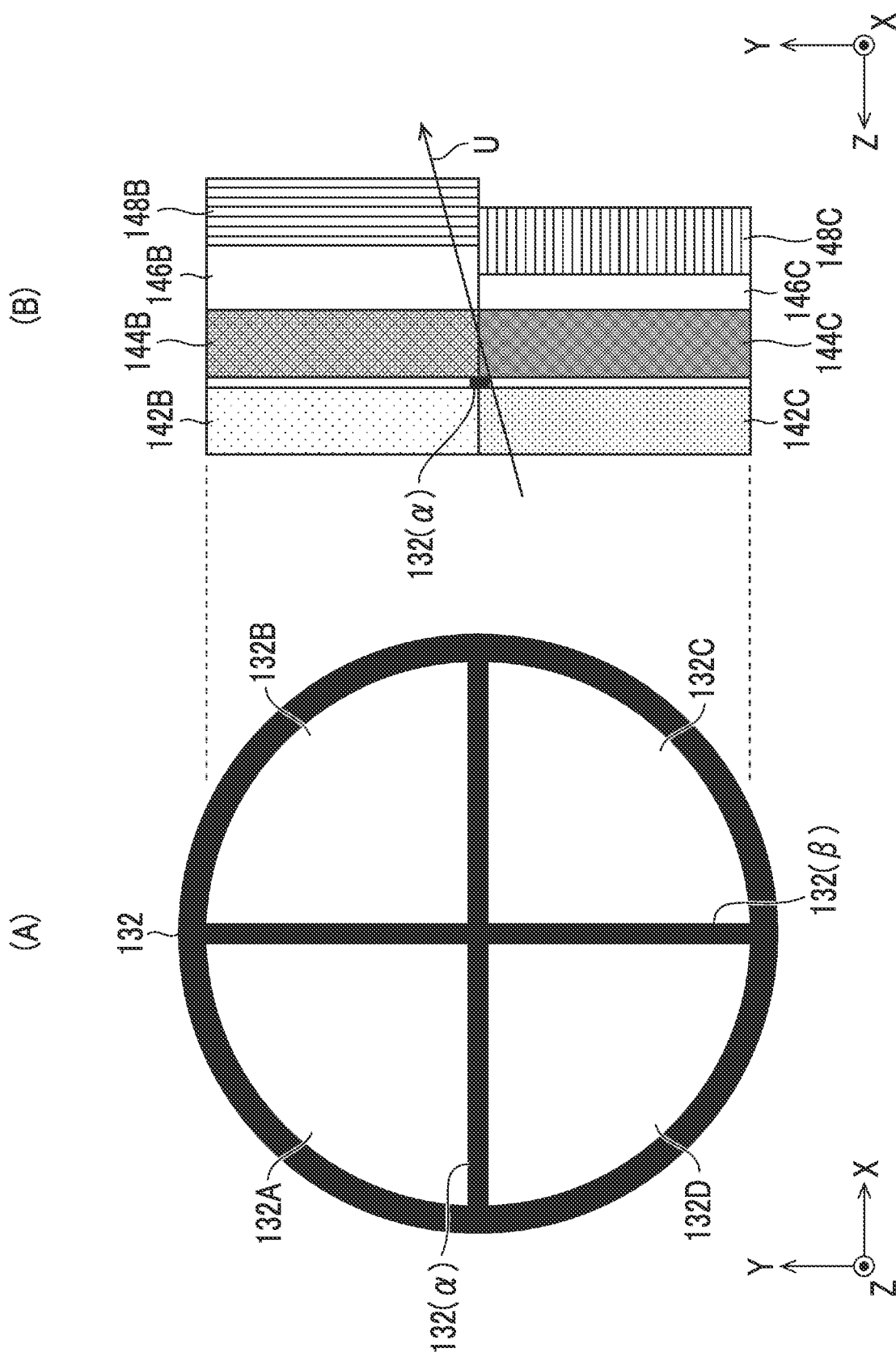
FIG. 11 is a diagram illustrating a case where crosstalk occurs.

FIG. 11 is a diagram illustrating a case where crosstalk occurs. (A) of FIG. 11 is a diagram showing the aperture regions 132A to 132D formed by the frame 132, and (B) of FIG. 11 is a diagram showing cross sections of the filter sets 140B and 140C disposed in the aperture regions 132B and 132C.

The aperture region 132B and the aperture region 132C are aperture regions adjacent to each other. The ND filter 142B, the optical filter 144B, the optical path length-correcting filter 146B, and the polarizing filter 148B are provided in the aperture region 132B. Further, the ND filter 142C, the optical filter 144C, the optical path length-correcting filter 146C, and the polarizing filter 148C are provided in the aperture region 132C.

A ray U obliquely incident on the aperture region 132C is incident on the ND filter 142C of the aperture region 132C first, and is then incident on the optical filter 144C. After being emitted from the optical filter 144C, the ray U is transmitted through the optical filter 144B, the optical path length-correcting filter 146B, and the polarizing filter 148B of the aperture region 132B. Then, after the ray U is transmitted through the optical filter 144C transmitting light having the wavelength range λ3, the ray U is transmitted through the optical filter 144B transmitting light having the wavelength range λ2. After being incident on the aperture region 132C as described above, the ray U is transmitted through the ND filter 142C, the optical filter 144C, the optical filter 144B, the optical path length-correcting filter 146B, and the polarizing filter 148B. Accordingly, crosstalk is caused by the ray U in this case, and the quality of an image to be obtained and spectral accuracy are adversely affected.

Hereinafter, there will be proposed an optical member 130 that can suppress crosstalk caused by the ray U obliquely incident as described above and suppress the deterioration of the quality of an image and an adverse effect on spectral accuracy and an imaging apparatus 10 that comprises the optical member 130. The suppression of the occurrence of crosstalk caused by an obliquely incident ray U will be described in the following description, but the occurrence of crosstalk caused by rays (for example, rays line-symmetric with respect to a boundary portion BL) other than the ray U can also be suppressed likewise.

First Embodiment

A ray incidence-reduction part W of a first embodiment of an optical member 130 will be described. In the present embodiment, the ray incidence-reduction part W is provided at a boundary portion BL (see FIG. 12) between side surfaces of the filters.

Figure 12:
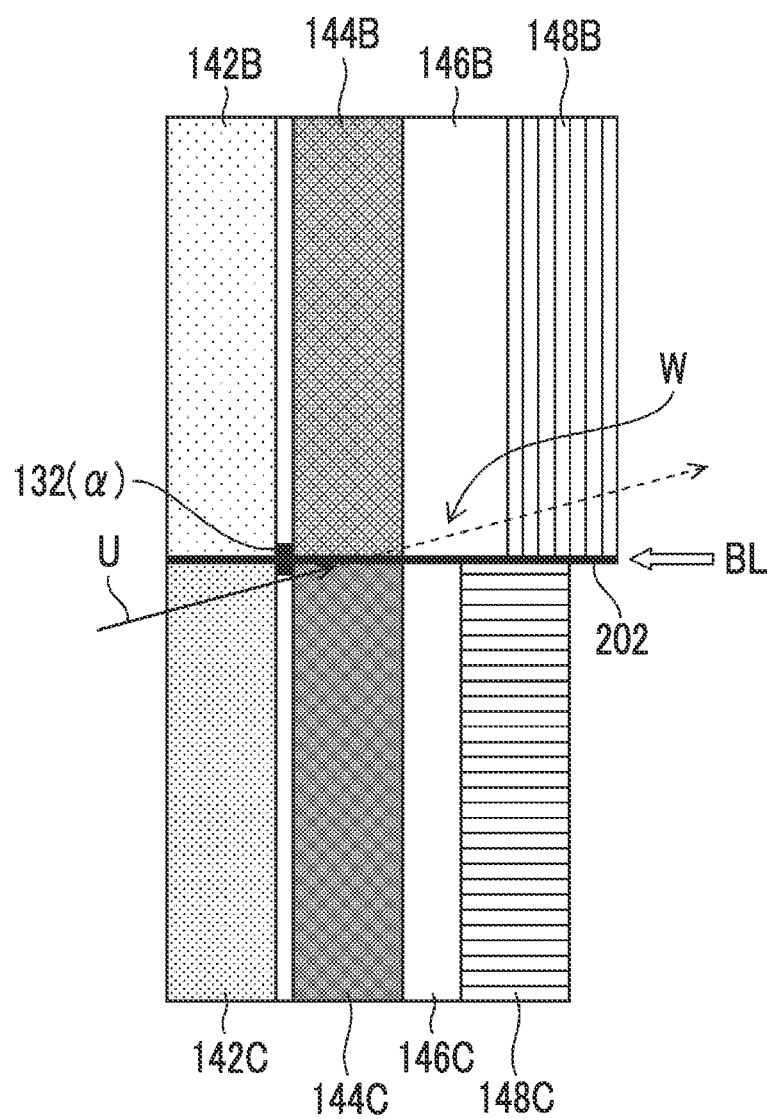
FIG. 12 is a diagram illustrating a ray incidence-reduction part W of a first embodiment.

FIG. 12 is a diagram illustrating the ray incidence-reduction part W of the present embodiment. A boundary portion BL between the aperture region 132B and the aperture region 132C will be described in the following description, but the same ray incidence-reduction part W is also provided between the aperture region 132A and the aperture region 132B.

The ray incidence-reduction part W is provided at the boundary portion BL between the aperture region 132C (first aperture region) and the aperture region 132B (second aperture region). Further, the ray incidence-reduction part W includes a region boundary member 132(α) of the frame 132, and a wall member 202 that extends between side surfaces of the filter sets 140B and 140C from the region boundary member 132(α) in a direction of an optical axis (a direction in which the filters are stacked). The wall member 202 is present to extend from an object side-end portion of the filter set 140B (140C) to an image side-end portion thereof as a whole. The region boundary member 132(α) and the wall member 202 may be formed integrally with each other or may be formed separately from each other. The ray incidence-reduction part W can prevent the ray U, which is incident from the aperture region 132C, from being incident on the aperture region 132B, and can suppress the occurrence of crosstalk. Here, suppression includes the meaning of prevention or reduction (the same applies to the following description).

Figure 13:
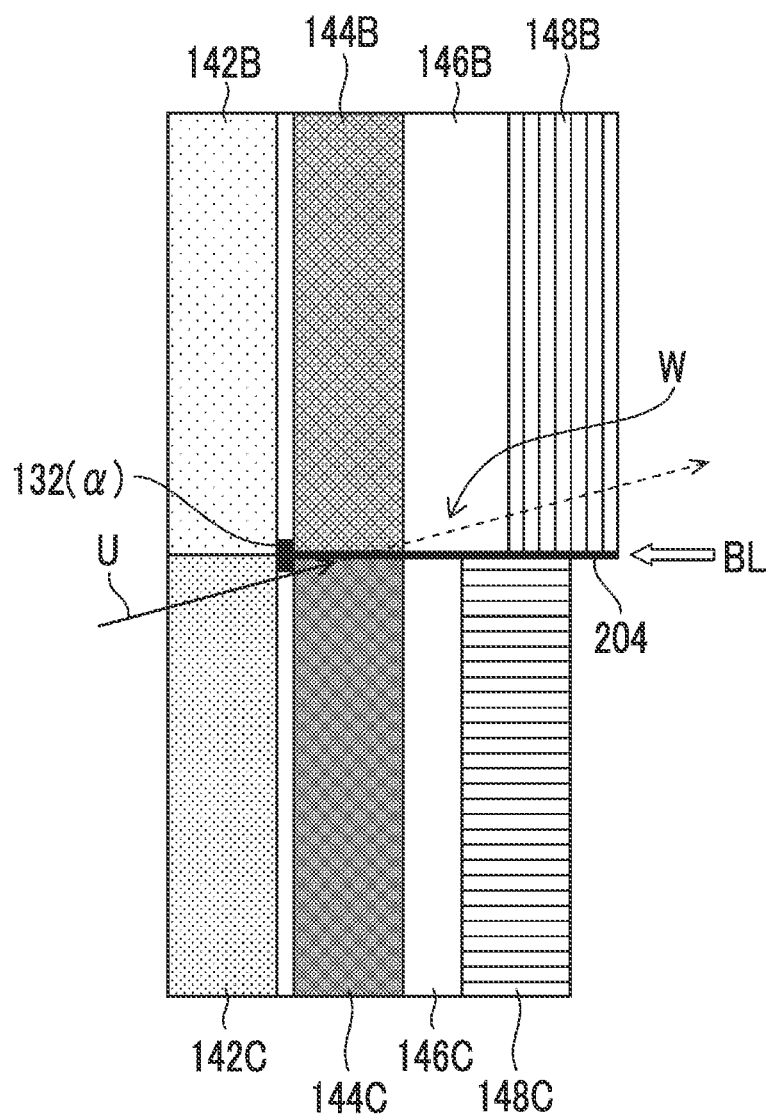
FIG. 13 is a diagram illustrating another example of the first embodiment.

FIG. 13 is a diagram illustrating another example of the first embodiment.

A ray incidence-reduction part W of this example is provided at a part of the boundary portion BL between the aperture region 132B and the aperture region 132C. The ray incidence-reduction part W includes a region boundary member 132(α) of the frame 132, and a wall member 204 that extends between side surfaces of the filter sets 140B and 140C from the region boundary member 132(α) in a direction of an optical axis. The wall member 204 extends from the region boundary member 132(α) to only the image side. The ray incidence-reduction part W prevents or reduces the incidence of a ray U, which is transmitted through the optical filter 144C, on the other aperture region. On the other hand, for example, a ray transmitted through the ND filter 142C may be incident on the aperture region 132B. However, due to the property of the ND filter, crosstalk caused by such a ray less affects the quality of an image to be obtained and spectral accuracy.

(In the Case of 3×3 Frame)

The frame 132 including the 2×2 aperture regions 132A to 132D has been described in the above description, but the application of the present embodiment is not limited to the frame 132. For example, the present embodiment can also be applied to a frame including 3×3 (nine) aperture regions.

Figure 14:
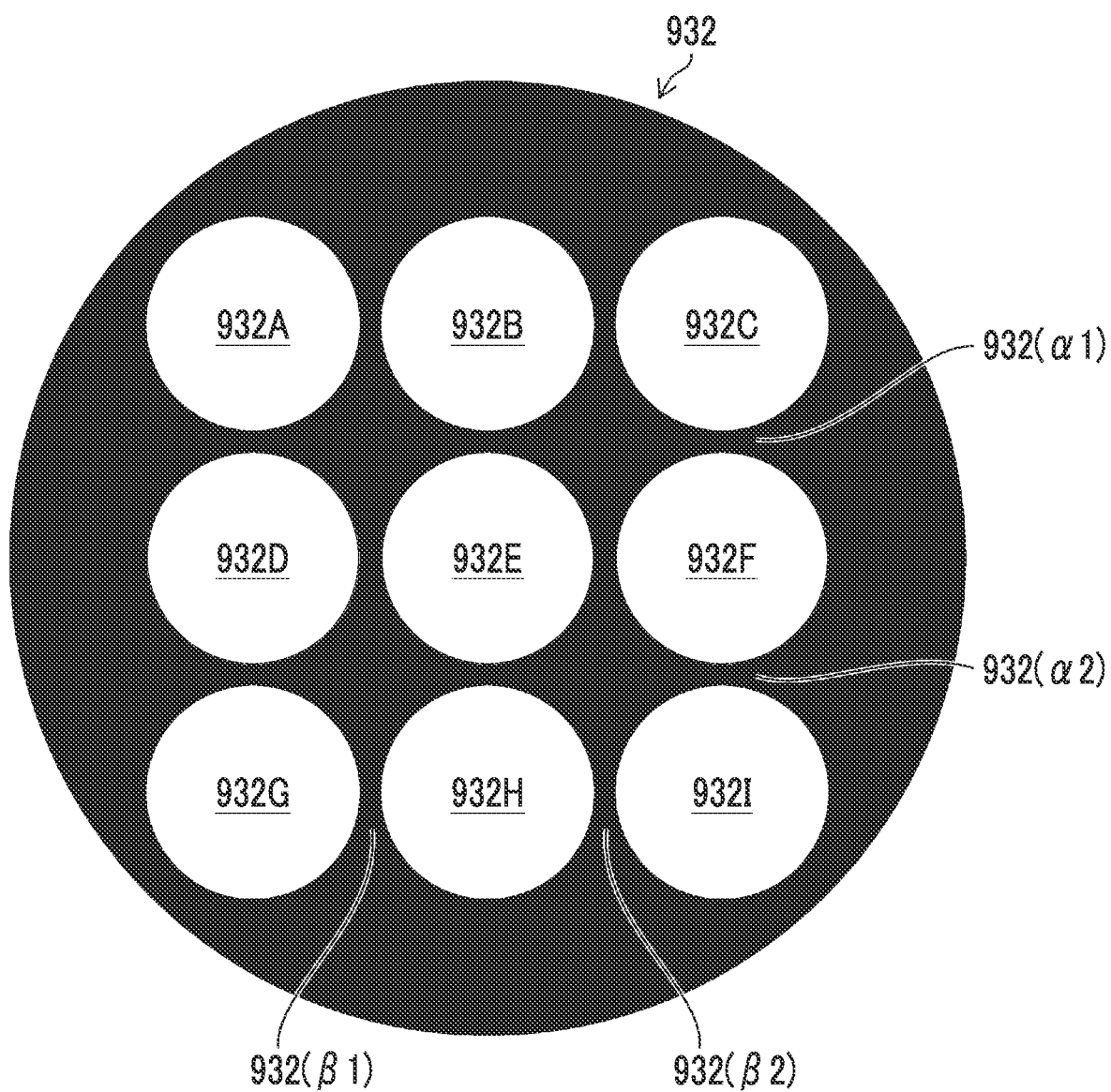
FIG. 14 is a conceptual diagram showing a frame.

FIG. 14 is a conceptual diagram showing a frame 932 that is to be mounted on the optical member 130 instead of the frame 132.

The frame 932 includes 3×3 aperture regions 932A to 932I. The frame 932 is provided in the optical member 130 shown in FIGS. 5 and 6 instead of the frame 132. Since the frame 932 is used, the imaging apparatus 10 can acquire up to nine different image data. Region boundary members 932(α1), 932(α2), 932(β1), and 932(β2) are provided in the frame 932 to correspond to the region boundary members 132(α) and 132(β) of the frame 132.

Figure 15:
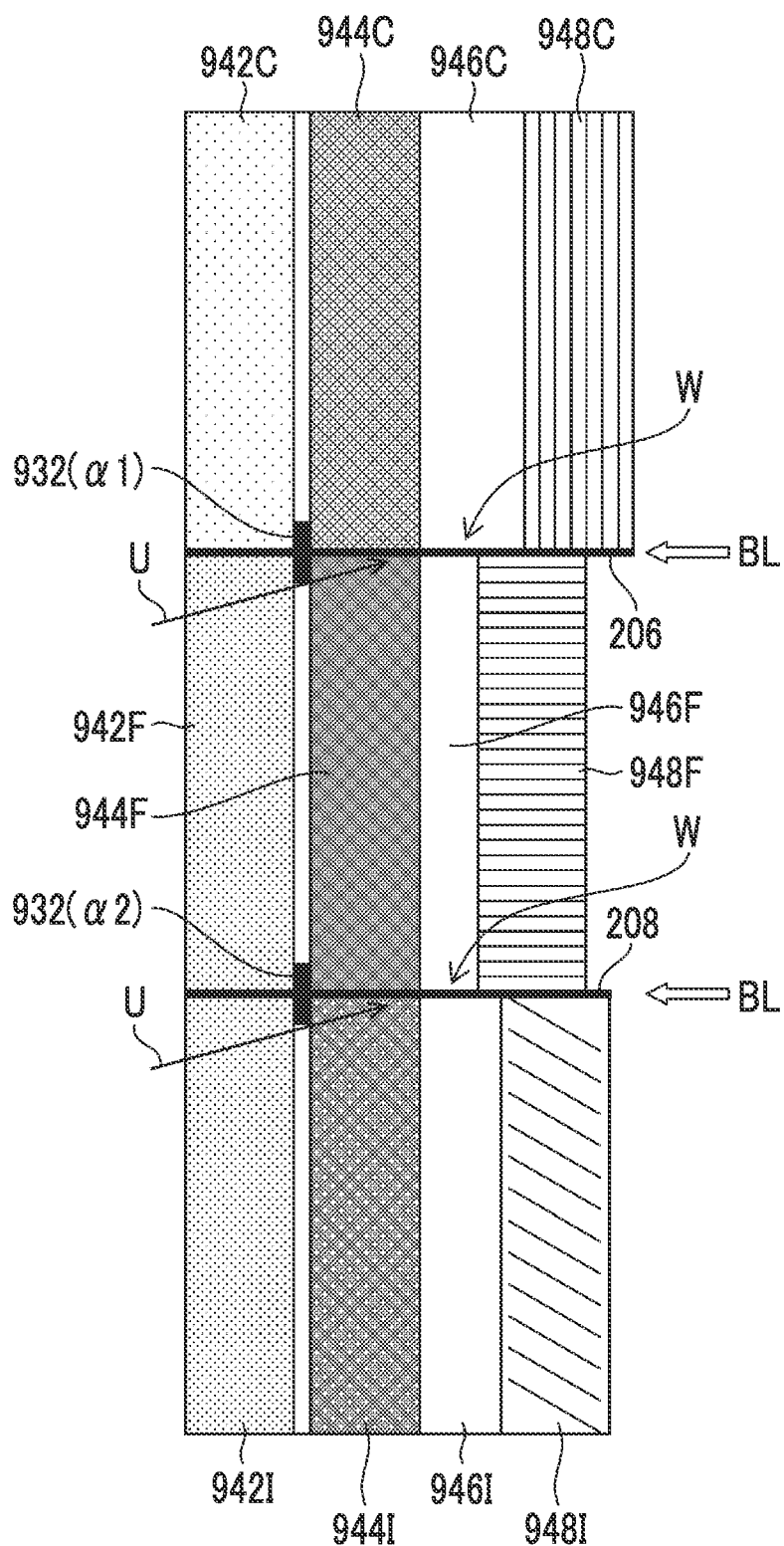
FIG. 15 is a diagram illustrating another example of the first embodiment.

FIG. 15 is a diagram illustrating another example of the first embodiment. Boundary portions BL between the aperture region 932C, the aperture region 932F, and the aperture region 932I will be described in the following description, but the same ray incidence-reduction part W is also provided at the boundary portion BL between the other aperture region and the aperture region.

A ray incidence-reduction part W of this example is provided in the frame 932 described with reference to FIG. 14. FIG. 15 shows the aperture region 932C, the aperture region 932F, and the aperture region 932I of the frame 932.

The ray incidence-reduction parts W of this example are provided at the boundary portion BL between the aperture region 932C and the aperture region 932F and at the boundary portion BL between the aperture region 932F and the aperture region 932I. Further, the ray incidence-reduction part W includes a region boundary member 932(α1) of the frame 932, and a wall member 206 that extends between side surfaces of the filter sets 140B and 140C from the region boundary member 932(α1) in a direction of an optical axis. Furthermore, the ray incidence-reduction part W includes a region boundary member 932(α2) of the frame 932, and a wall member 208 that extends between side surfaces of the filter sets 140B and 140C from the region boundary member 932(α2) in the direction of the optical axis. The wall members 206 and 208 are present from the object side-end portion of the filter set up to the image side-end portion thereof. The ray incidence-reduction part W can prevent a ray U, which is incident from the aperture region 932F, from being incident on the aperture region 932C, and can suppress the occurrence of crosstalk. Further, the ray incidence-reduction part W can prevent a ray U, which is incident from the aperture region 932I, from being incident on the aperture region 932F, and can suppress the occurrence of crosstalk.

Second Embodiment

A second embodiment of the optical member 130 will be described. In the present embodiment, a space (gap) is provided as a ray incidence-reduction part W at a boundary portion BL to totally reflect a ray U.

Figure 16:
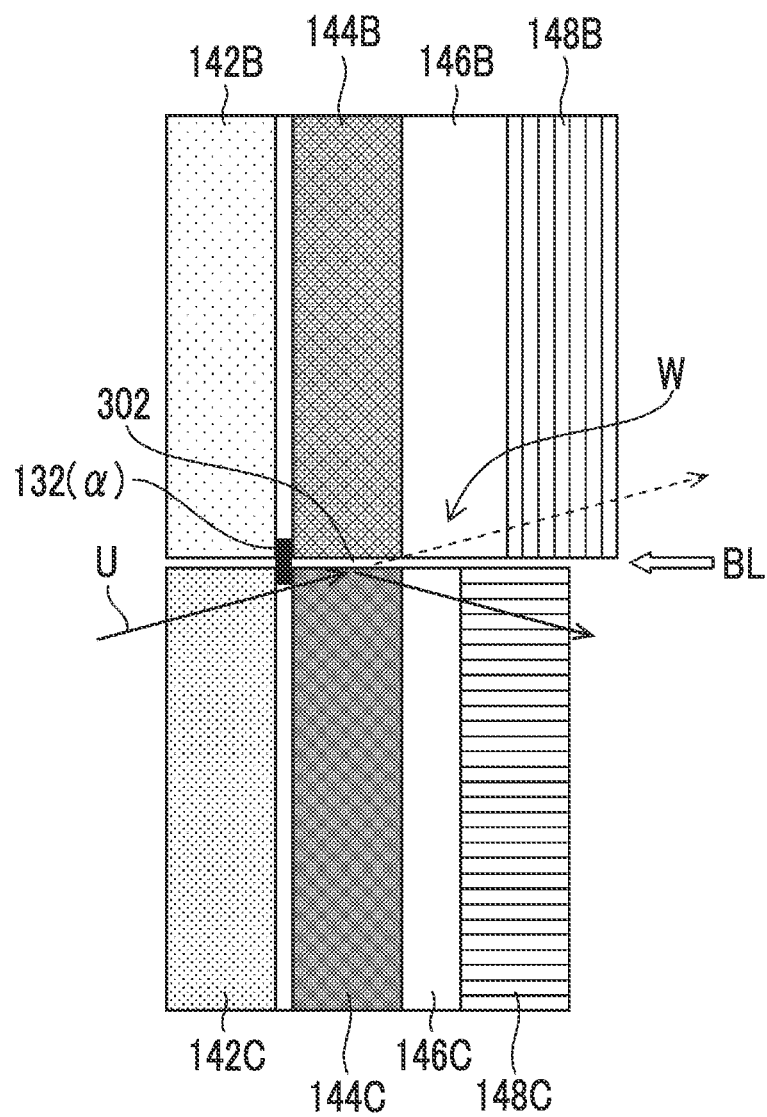
FIG. 16 is a diagram illustrating a ray incidence-reduction part of a second embodiment.

FIG. 16 is a diagram illustrating a ray incidence-reduction part W of the second embodiment. Meanwhile, a case where the incidence angle of a ray U satisfies an angle for total reflection will be described in the following description.

The ray incidence-reduction part W is provided at the boundary portion BL between the aperture region 132B and the aperture region 132C. Specifically, a space 302 is provided as the ray incidence-reduction part W at the boundary portion BL from object side-end portions of the filter sets 140B and 140C to image side-end portions thereof. In a case where the incidence angle of a ray U satisfies a predetermined condition, this space 302 can totally reflect the ray U and can prevent the ray U from being incident on the aperture region 132B. As described above, in a case where the ray U satisfies a predetermined condition, the space 302 can totally reflect the ray U to prevent the ray U from being incident on the aperture region 132B and to suppress the occurrence of crosstalk.

Figure 17:
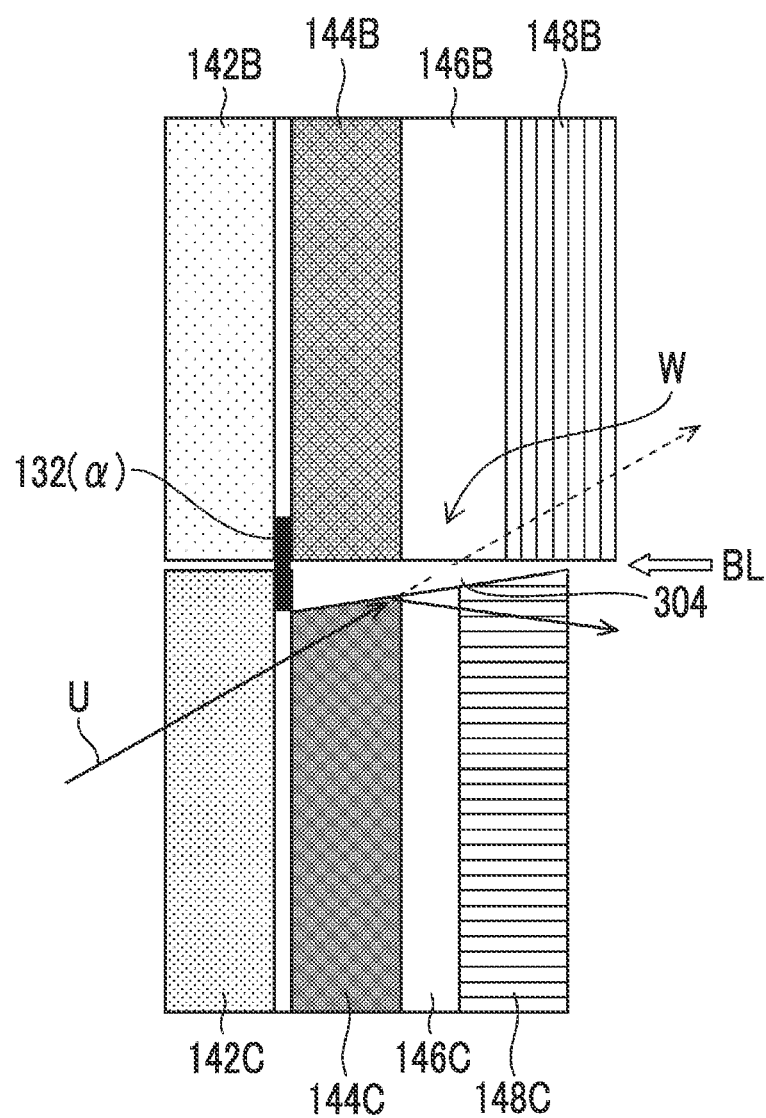
FIG. 17 is a diagram illustrating another example of the second embodiment.

FIG. 17 is a diagram illustrating another example of the second embodiment.

A ray incidence-reduction part W of this example is provided at the boundary portion BL between the aperture region 132B and the aperture region 132C. Specifically, a space 304 is provided as the ray incidence-reduction part W at the boundary portion BL from object side-end portions of the filter sets 140B and 140C to image side-end portions thereof. The space 304 has an inclination from a lower end portion of the region boundary member 132(α) toward the boundary portion BL at upper end portions of the optical filter 144C, the optical path length-correcting filter 146C, and the polarizing filter 148C. Since the space 304 has an inclination as described above, the ray U is more likely to satisfy a condition for total reflection. That is, since the space 304 has an inclination, the incidence angle of the ray U can be reduced. As described above, in a case where the ray U satisfies a predetermined condition, the space 304 can totally reflect the ray U to prevent the ray U from being incident on the aperture region 132B and to suppress the occurrence of crosstalk.

(In the Case of 3×3 Frame)

An example in which the ray incidence-reduction part W of the second embodiment is provided in the 3×3 frame 932 (see FIG. 14).

Figure 18:
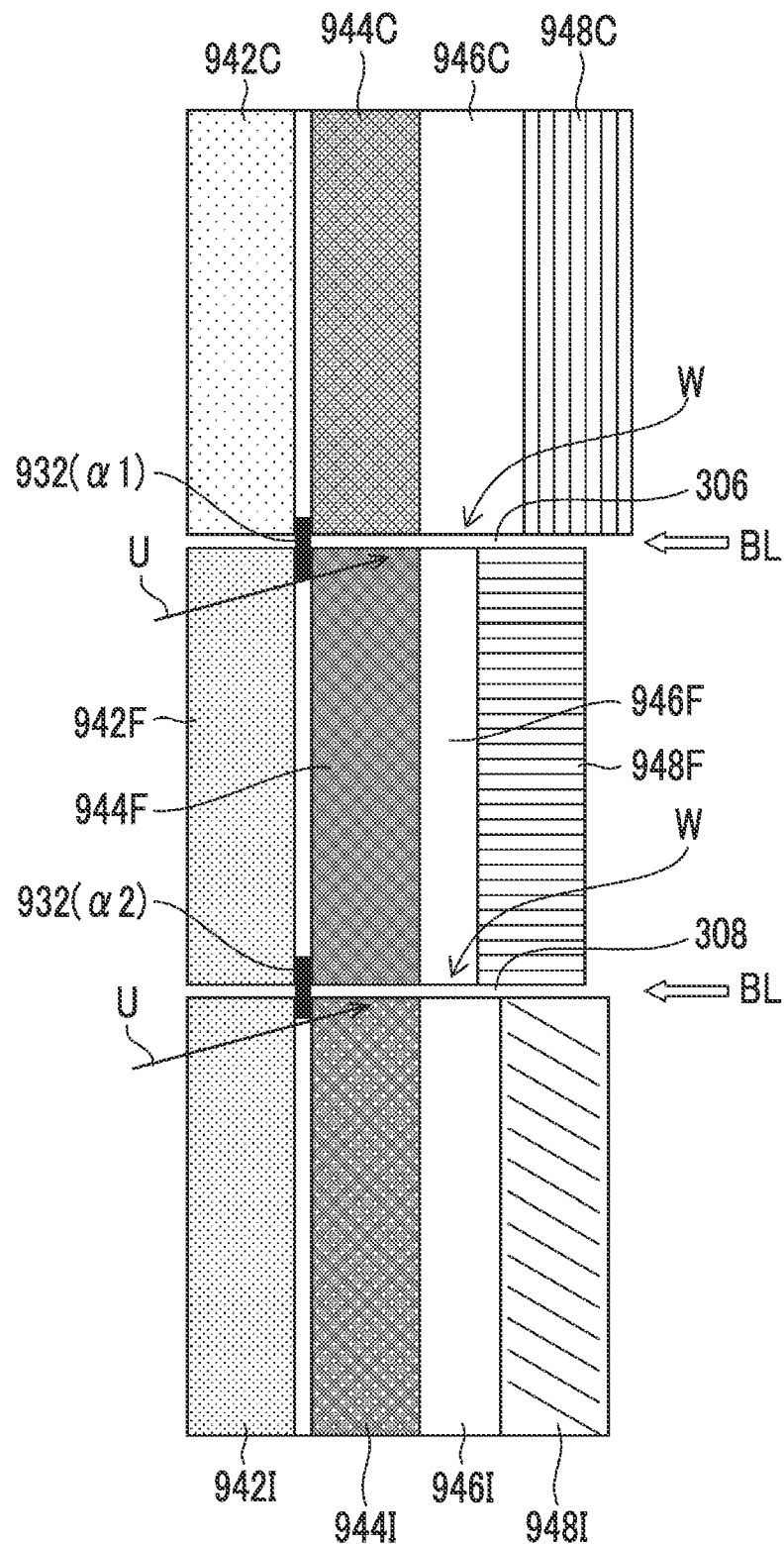
FIG. 18 is a diagram illustrating another example of the second embodiment.

FIG. 18 is a diagram illustrating another example of the second embodiment.

A ray incidence-reduction part W is provided at the boundary portion BL between the aperture region 932C and the aperture region 932F. Further, a ray incidence-reduction part W is provided at the boundary portion BL between the aperture region 932F and the aperture region 932I. Specifically, a space 306 and a space 308 are provided as the ray incidence-reduction parts W at the boundary portions BL from object side-end portions of the filter sets to image side-end portions thereof. In a case where the incidence angle of a ray U satisfies a predetermined condition, the space 306 and the space 308 can totally reflect the ray U and prevent the ray U from being incident on the aperture regions other than the aperture region on which the ray U is once incident. As a result, the occurrence of crosstalk can be suppressed.

Third Embodiment

A third embodiment of the optical member 130 will be described. In the present embodiment, a reflective part for guiding the reflected light of a ray U to the object side is provided as a ray incidence-reduction part W at a boundary portion BL.

Figure 19:
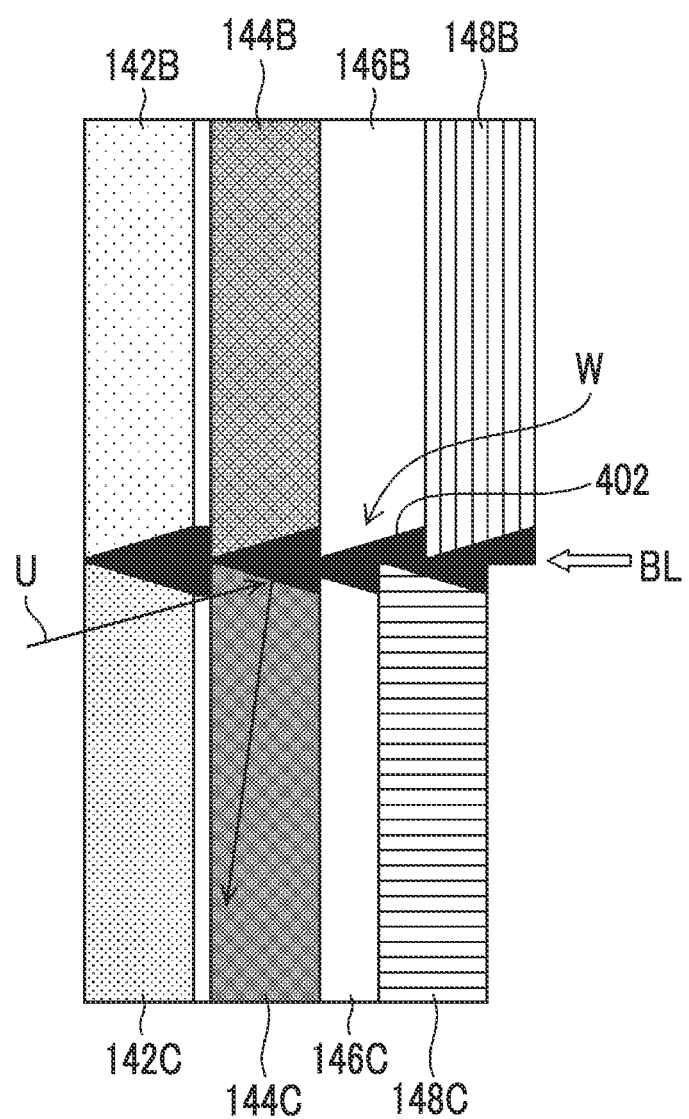
FIG. 19 is a diagram illustrating a ray incidence-reduction part W of a third embodiment.

FIG. 19 is a diagram illustrating a ray incidence-reduction part W of the third embodiment.

The ray incidence-reduction part W comprises return portions 402 at the boundary portion BL between the aperture region 132B and the aperture region 132C. Specifically, as the ray incidence-reduction part W, a return portion 402 inclined from the object side to the image side is provided at the boundary portion BL between the ND filter 142B and the ND filter 142C, a return portion 402 inclined from the object side to the image side is provided at the boundary portion BL between the optical filter 144B and the optical filter 144C, a return portion 402 inclined from the object side to the image side is provided at the boundary portion BL between the optical path length-correcting filter 146B and the optical path length-correcting filter 146C, and a return portion 402 inclined from the object side to the image side is provided at the boundary portion BL between the polarizing filter 148B and the polarizing filter 148C. The return portions 402 reflect a ray U, and further return the reflected light of the ray U to the object side. Since the return portions 402 can prevent the ray U from being incident on the aperture region 132B by reflecting the ray U, the return portions 402 can suppress the occurrence of crosstalk. Further, since the return portions 402 can suppress stray light caused by the reflected light of the ray U by returning the reflected light of the ray U to the object side, the return portions 402 can suppress flare or a ghost.

Figure 20:
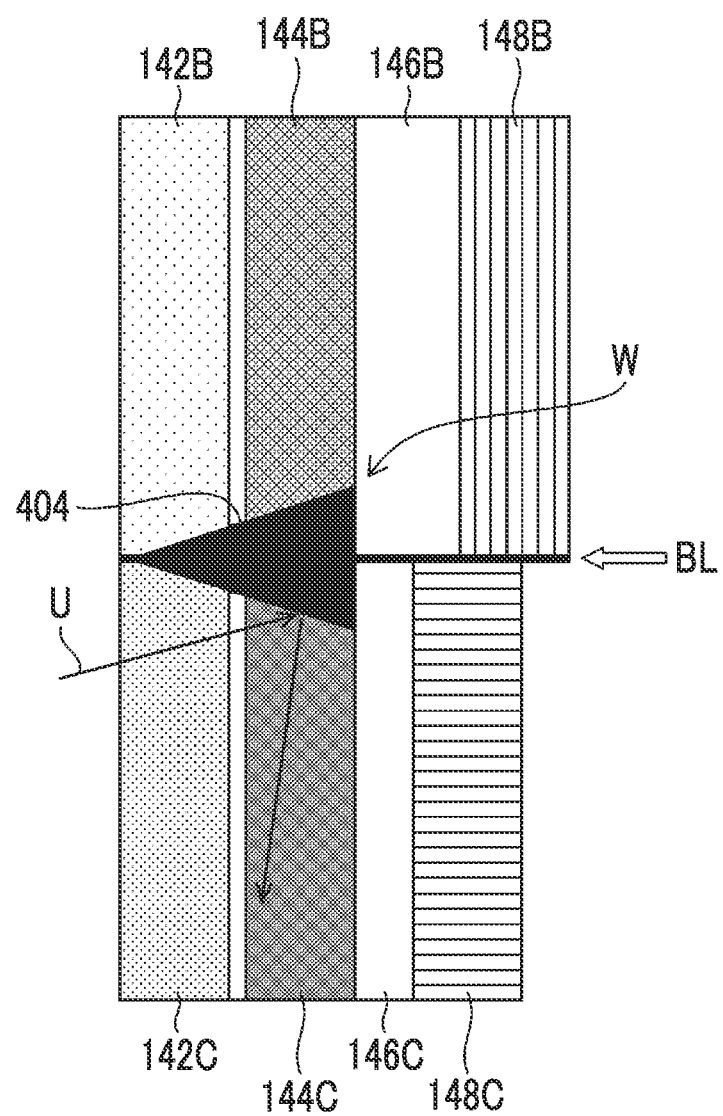
FIG. 20 is a diagram illustrating another example of the third embodiment.

FIG. 20 is a diagram illustrating another example of the third embodiment.

A ray incidence-reduction part W comprises a return portion 404 at the boundary portion BL between the aperture region 132B and the aperture region 132C. Specifically, the return portion 404 having an inclination from the object side to the image side is provided at the boundary portion BL between the ND filter 142B and the optical filter 144B and the ND filter 142C and the optical filter 144C. The return portion 404 reflects a ray U, and further returns the reflected light of the ray U to the object side. As shown in FIG. 20, a wall member is provided at the boundary portion BL between the optical path length-correcting filters 146B and 146C and between the polarizing filters 148B and 148C as described in the first embodiment. The return portion 404 reflects a ray U transmitted through the ND filter 142C and the optical filter 144C and guides the reflected light to the object side. Accordingly, since it is possible to prevent or reduce the incidence of the ray U on the aperture region 132B, it is possible to suppress the occurrence of crosstalk. In addition, since it is possible to prevent or reduce stray light caused by the reflected light of the ray U, it is possible to suppress flare or a ghost.

(In the Case of 3×3 Frame)

An example in which the ray incidence-reduction part W of the third embodiment is provided in the 3×3 frame 932 (see FIG. 14).

Figure 21:
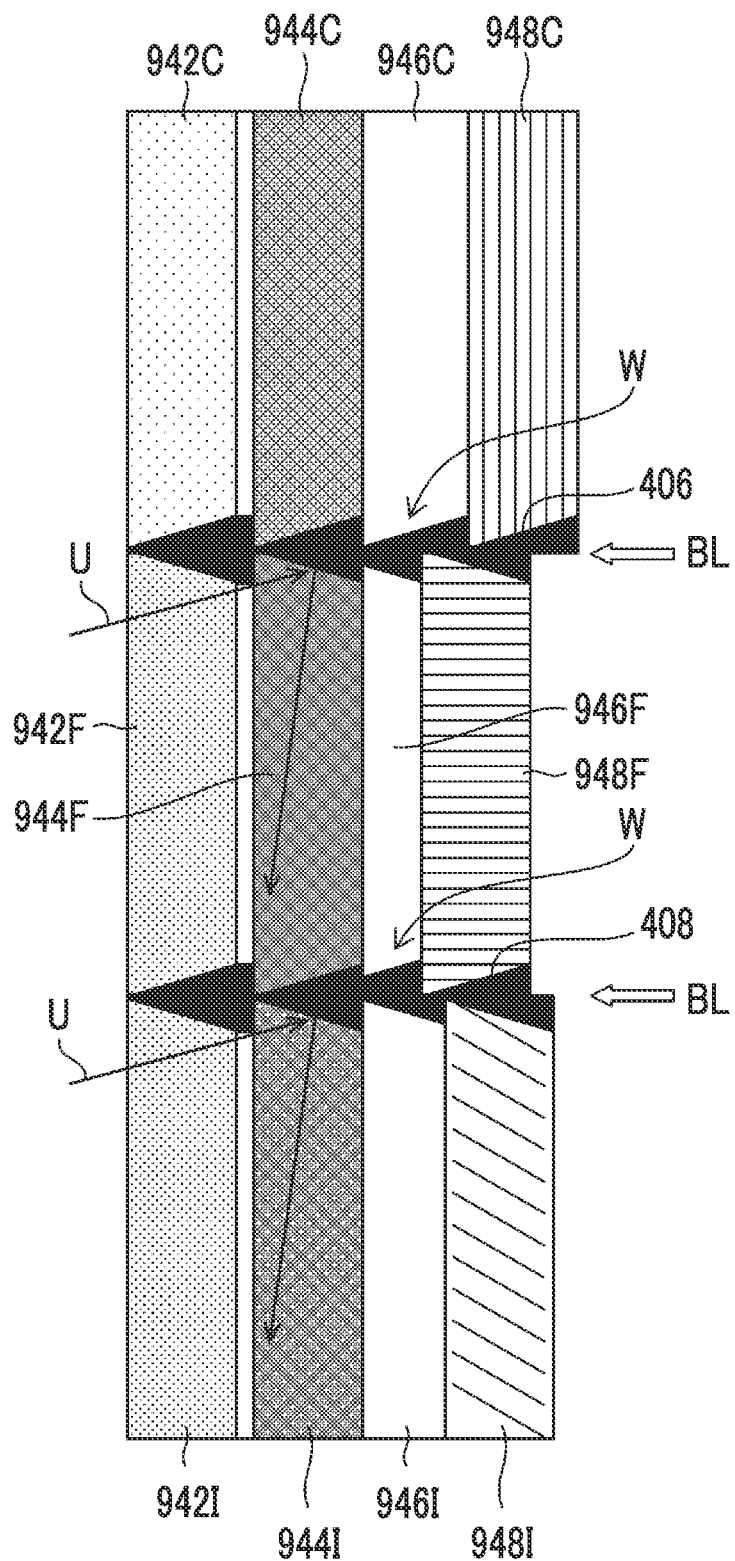
FIG. 21 is a diagram illustrating another example of the third embodiment.

FIG. 21 is a diagram illustrating another example of the third embodiment.

Ray incidence-reduction parts W comprise return portions 406 provided at the boundary portion BL between the aperture region 932C and the aperture region 932F and return portions 408 provided at the boundary portion BL between the aperture region 932F and the aperture region 932I. Specifically, as the ray incidence-reduction part W, a return portion 406 having an inclination from the object side to the image side is provided at the boundary portion BL between the ND filter 942C and the ND filter 942F, a return portion 406 having an inclination from the object side to the image side is provided at the boundary portion BL between the optical filter 944C and the optical filter 944F, a return portion 406 having an inclination from the object side to the image side is provided at the boundary portion BL between the optical path length-correcting filter 946C and the optical path length-correcting filter 946F, and a return portion 406 having an inclination from the object side to the image side is provided at the boundary portion BL between the polarizing filter 948C and the polarizing filter 948F. Further, as the ray incidence-reduction part W, a return portion 408 having an inclination from the object side to the image side is provided at the boundary portion BL between the ND filter 942F and the ND filter 942I, a return portion 408 having an inclination from the object side to the image side is provided at the boundary portion BL between the optical filter 944F and the optical filter 944I, a return portion 408 having an inclination from the object side to the image side is provided at the boundary portion BL between the optical path length-correcting filter 946F and the optical path length-correcting filter 946I, and a return portion 408 having an inclination from the object side to the image side is provided at the boundary portion BL between the polarizing filter 948F and the polarizing filter 948I. Since the return portions 406 and 408 can reflect a ray U and prevent the ray U from being incident on the regions other than the region on which the ray U is incident, the return portions 406 and 408 can suppress the occurrence of crosstalk. In addition, since the return portions 406 and 408 can suppress stray light caused by the reflected light of the ray U by returning the reflected light of the ray U to the object side, the return portions 406 and 408 can suppress flare or a ghost.

Figure 22:
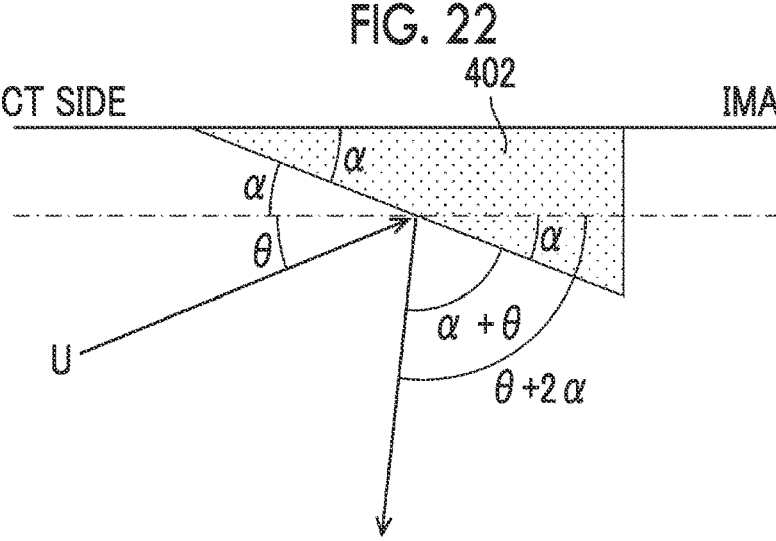
FIG. 22 is a diagram illustrating a return angle of a return portion.

FIG. 22 is a diagram illustrating a return angle of the return portion 402.

In a case where an angle of the return portion 402 is denoted by α (rad) and a ray U is reflected at a ray angle θ (rad) by the return portion 402, it is necessary to satisfy the following expression (1) to reflect reflected light to the object side.

$$\theta + 2\alpha - 2\varepsilon > \pi/2 \tag{1}$$

ε (rad) denotes an inclination of the frame 132.

From Expression (1), a return angle α (rad) of the return portion 402 is expressed by the following expression (2).

$$\alpha > \pi/4 - \theta/2 + \varepsilon \tag{2}$$

Here, the ray angle θ (rad) represents the maximum angle among ray angles at the entire image height passing through the center of the frame 132. Further, the ray angle θ (rad) is a ray angle θ (rad) at the height of the frame 932 in the case of the frame 932. A ray angle at the height of the frame 932 represents the maximum angle among ray angles at the entire image height passing through the height of the frame 932. These are the same in the following description.

Fourth Embodiment

A fourth embodiment of the optical member 130 will be described. A ray incidence-reduction part W of the present embodiment includes a first light shielding portion that is provided along the optical axis L at the boundary portion BL, and a second light shielding portion that extends from the boundary portion BL in a direction along a plane perpendicular to the optical axis L.

Figure 23:
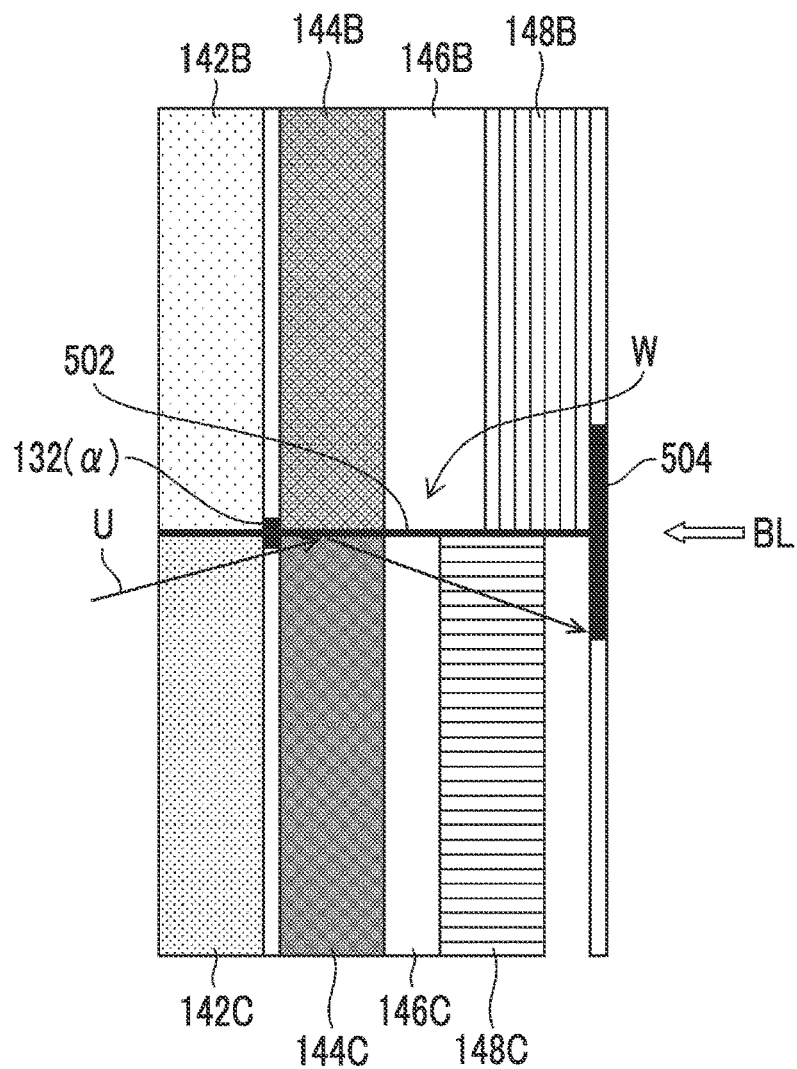
FIG. 23 is a diagram illustrating a ray incidence-reduction part W of a fourth embodiment.

FIG. 23 is a diagram illustrating a ray incidence-reduction part W of the fourth embodiment.

A first light shielding portion 502 of the ray incidence-reduction part W is provided at the boundary portion BL between the aperture region 132B and the aperture region 132C. The first light shielding portion 502 is a wall member that extends between side surfaces of the filter sets 140B and 140C from the region boundary member 132(α) in the direction of the optical axis L. The first light shielding portion 502 is present to extend from an object side-end portion of the filter set to an image side-end portion thereof. Further, a second light shielding portion 504 of the ray incidence-reduction part W is provided on the image side of the filter set 140 to extend from the boundary portion BL along a plane perpendicular to the optical axis L. For example, the second light shielding portion 504 is provided in such a manner that another frame, which is the same as the frame 132, is provided on the image side of the filter set 140. Since it is possible to prevent a ray U, which is incident from the aperture region 132C, from being incident on the aperture region 132B by the ray incidence-reduction part W that includes the first light shielding portion 502 and the second light shielding portion 504 as described above, it is possible to suppress the occurrence of crosstalk and to suppress the occurrence of flare or a ghost that is caused by the reflected light of the ray U reflected by the first light shielding portion 502.

Figure 24:
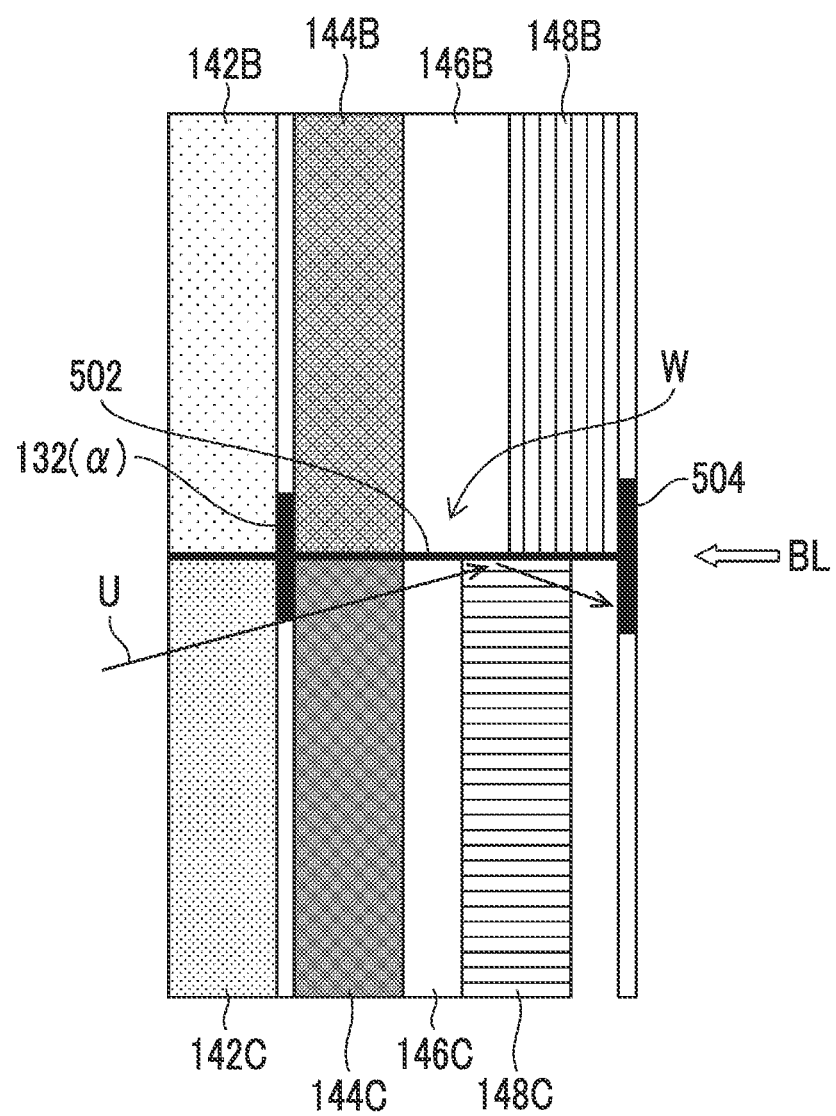
FIG. 24 is a diagram illustrating another example of the fourth embodiment.

FIG. 24 is a diagram illustrating another example of the fourth embodiment.

A ray incidence-reduction part W includes a first light shielding portion 502 and a second light shielding portion 504. A region boundary member 132(α) is formed to have a height larger than that of the example described with reference to FIG. 23, and the second light shielding portion 504 is formed to have a height smaller than that of the example described with reference to FIG. 23. Since it is possible to prevent a ray U, which is incident from the aperture region 132C, from being incident on the aperture region 132B by the ray incidence-reduction part W that includes the first light shielding portion 502 and the second light shielding portion 504 as described above, it is possible to suppress the occurrence of crosstalk and to suppress the occurrence of flare or a ghost that is caused by the reflected light of the ray U reflected by the first light shielding portion 502. It is possible to suppress a reduction in the amount of light by appropriately adjusting the height of the second light shielding portion 504 according to the height of the region boundary member 132(α).

Figure 25:
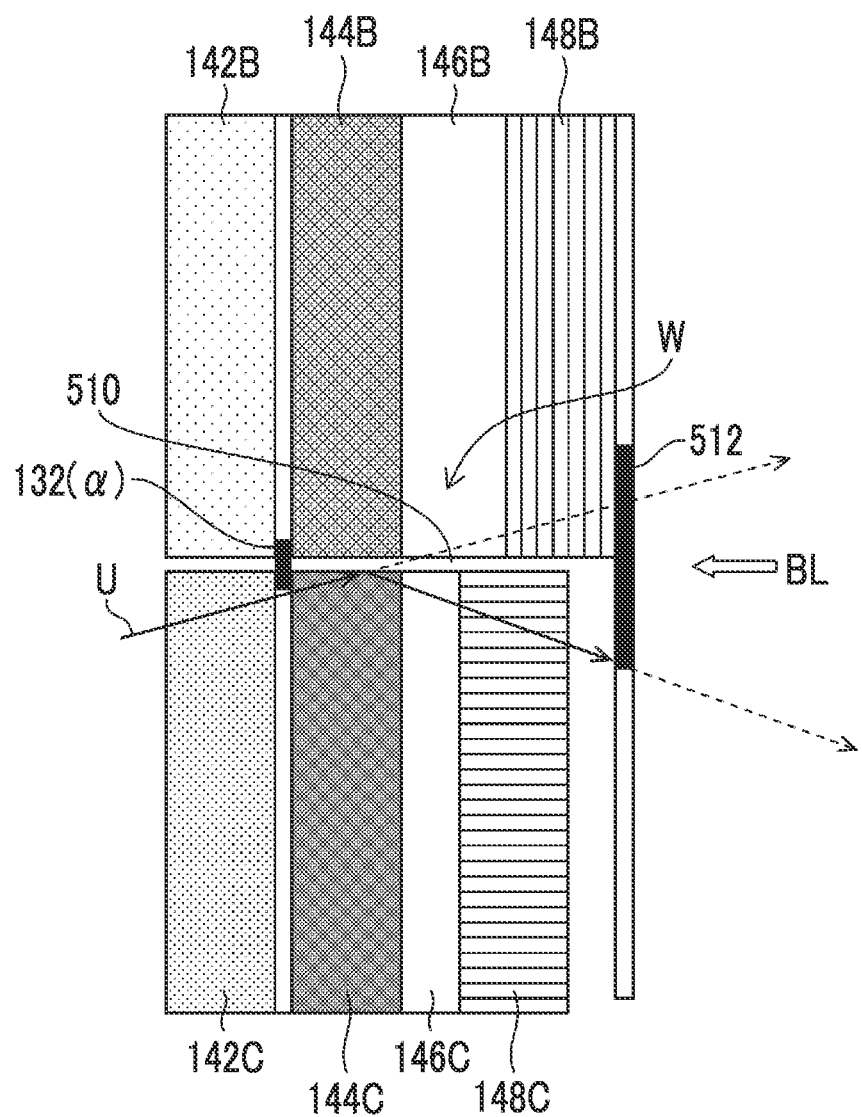
FIG. 25 is a diagram illustrating another example of the fourth embodiment.

FIG. 25 is a diagram illustrating another example of the fourth embodiment.

A first light shielding portion 510 of a ray incidence-reduction part W is provided at the boundary portion BL between the aperture region 132B and the aperture region 132C. Specifically, a space is provided as the first light shielding portion 510 at the boundary portion BL from object side-end portions of the filter sets 140B and 140C to image side-end portions thereof. In a case where the incidence angle of a ray U satisfies a predetermined condition, the first light shielding portion 510 can totally reflect the ray U. Further, a second light shielding portion 512 of the ray incidence-reduction part W is provided on the image side of the filter set 140 to extend from the boundary portion BL along a plane perpendicular to the optical axis L. Since it is possible to prevent a ray U, which is incident from the aperture region 132C, from being incident on the aperture region 132B by the ray incidence-reduction part W that includes the first light shielding portion 510 and the second light shielding portion 512 as described above, it is possible to suppress the occurrence of crosstalk and to suppress the occurrence of flare or a ghost that is caused by the ray U reflected by the first light shielding portion 510.

(In the Case of 3×3 Frame)

An example in which the ray incidence-reduction part W of the fourth embodiment is provided in the 3×3 frame 932 (see FIG. 14).

Figure 26:
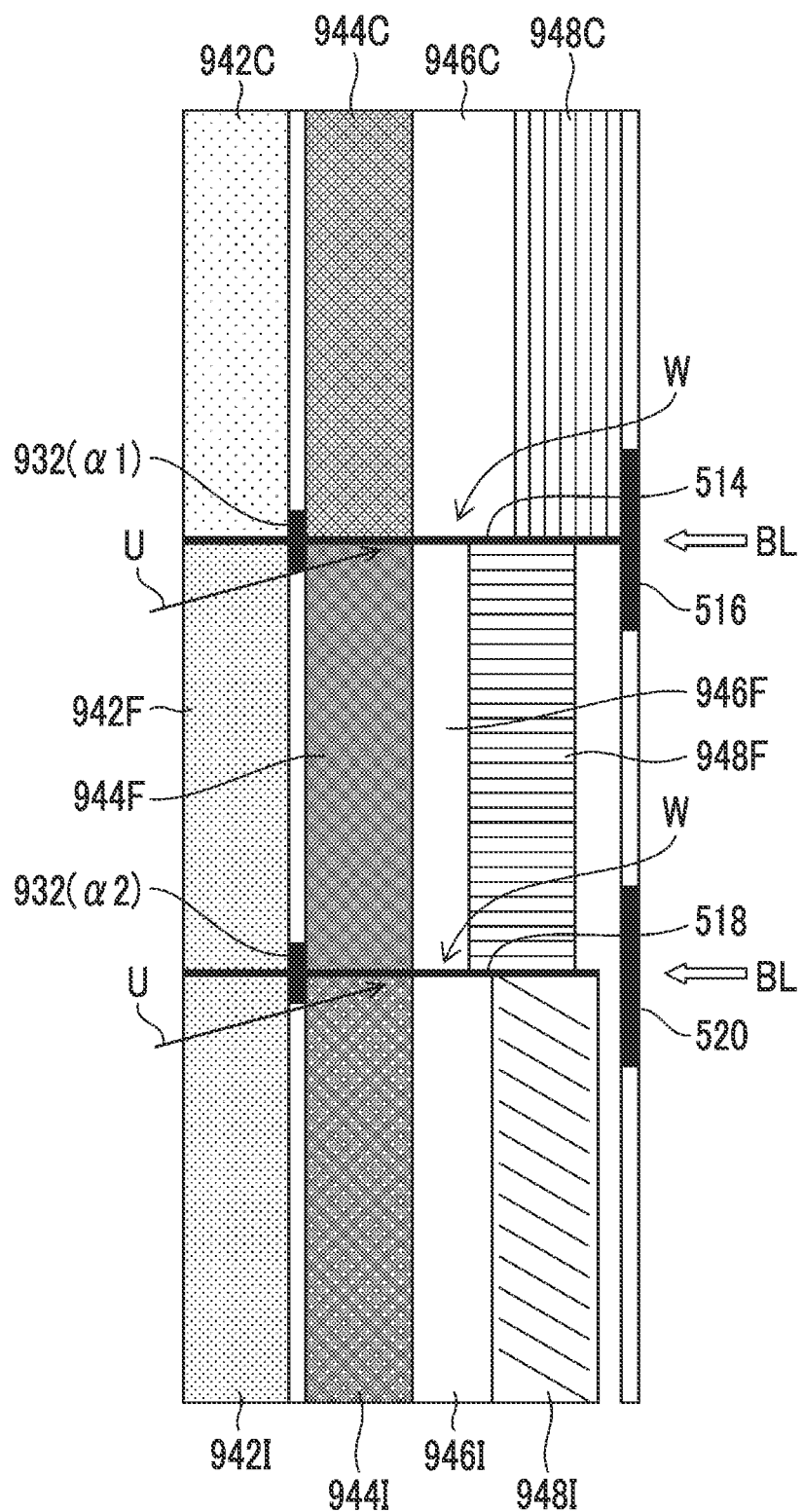
FIG. 26 is a diagram illustrating another example of the fourth embodiment.

FIG. 26 is a diagram illustrating another example of the fourth embodiment.

A first light shielding portion 514 of a ray incidence-reduction part W is provided at the boundary portion BL between the aperture region 932C and the aperture region 932F. Further, a first light shielding portion 518 is provided at the boundary portion BL between the aperture region 932F and the aperture region 932I. The first light shielding portions 514 and 518 are wall members that are provided at the boundary portions BL to extend in the direction of the optical axis L. The wall members are present to extend from object side-end portions of the filter sets to image side-end portions thereof. Further, a second light shielding portion 516 and a second light shielding portion 520 of the ray incidence-reduction parts W are provided on the image side of the filter sets 140 to extend from the boundary portions BL along a plane perpendicular to the optical axis L. For example, the second light shielding portion 516 and the second light shielding portion 520 are provided in such a manner that other frames, which are the same as the frame 932, are provided on the image side of the filter sets 140. Since it is possible to prevent a ray from being incident on the aperture regions other than the aperture region on which the ray is incident by the ray incidence-reduction part W that includes the first light shielding portion 514 and the second light shielding portion 516 and the ray incidence-reduction part W that includes the first light shielding portion 518 and the second light shielding portion 520 as described above, it is possible to suppress the occurrence of crosstalk and to suppress the occurrence of flare or a ghost that is caused by the reflected light of the ray U reflected by the first light shielding portion 514 (first light shielding portion 518).

Figure 27:
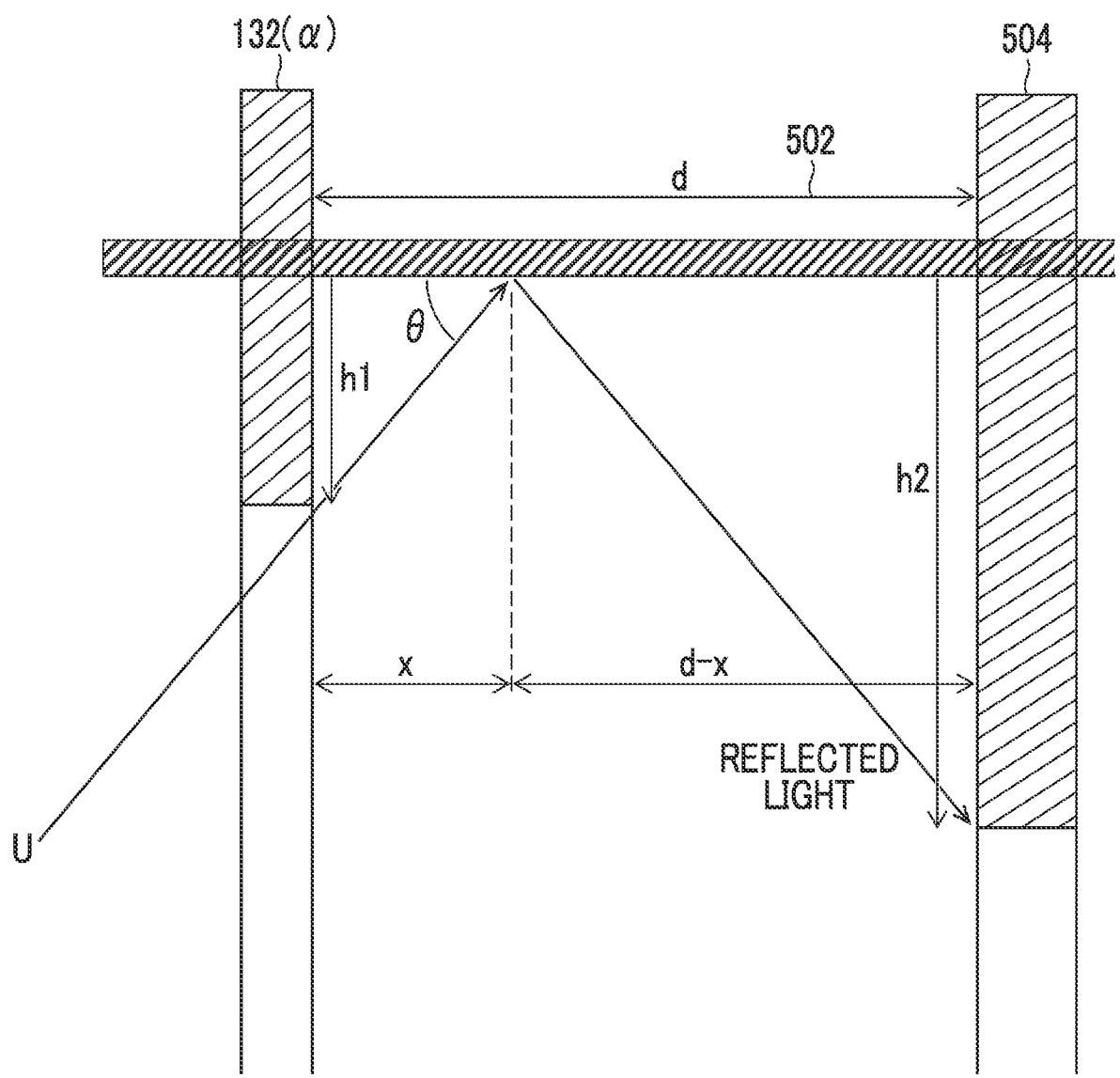
FIG. 27 is a diagram illustrating a correlation between a height of a region boundary member and a height of a second light shielding portion.

FIG. 27 is a diagram illustrating a correlation between the height of the region boundary member 132(α) and the height of the second light shielding portion.

In a case where the height of the region boundary member 132(α) is denoted by h1 and the height of the second light shielding portion 504 is denoted by h2, it is necessary to satisfy the conditions of the following expressions (3) and (4) to block the reflected light of the ray U by the second light shielding portion 504.

$$h2 > (d-x)\tan(\theta+\varepsilon) \tag{3}$$

$$x \tan(\theta+\varepsilon) = h1 \tag{4}$$

A ray angle is denoted by θ (rad), a filter thickness between the region boundary member 132(α) and the second light shielding portion 504 is denoted by d, and the fall of the frame 132 is denoted by ε (rad).

In a case where Expression for h2 is calculated from Expressions (3) and (4) described above, the following expression (5) is obtained.

$$h2 > d \tan(\theta+\varepsilon) - h1 \tag{5}$$

The ray angle θ (rad) in Expression (5) corresponds to the case of the 2×2 frame 132, and a ray angle θ (rad) at the height of the frame is applied in the case of the 3×3 frame 932.

Fifth Embodiment

A fifth embodiment of the optical member 130 will be described. A ray incidence-reduction part W of the present embodiment includes a first light shielding portion that is provided along the optical axis L at the boundary portion BL, and a second light shielding portion that extends from the boundary portion BL in a direction along a plane perpendicular to the optical axis L. Further, the first light shielding portion has an inclination that reduces the reflection angle of reflected light.

Figure 28:
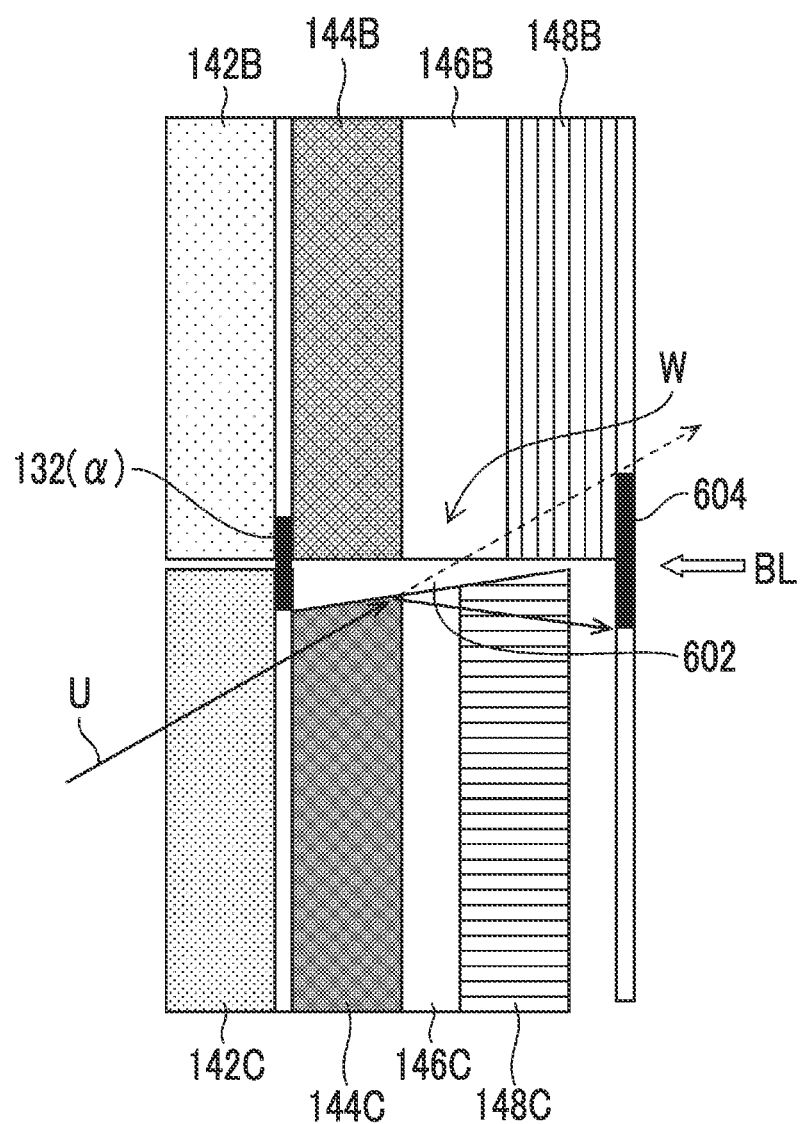
FIG. 28 is a diagram illustrating a ray incidence-reduction part W of a fifth embodiment.

FIG. 28 is a diagram illustrating the ray incidence-reduction part W of the fifth embodiment.

The first light shielding portion 602 of the ray incidence-reduction part W is provided at the boundary portion BL between the aperture region 132B and the aperture region 132C. The first light shielding portion 602 includes a space that extends between side surfaces of the filter sets 140B and 140C from the region boundary member 132($\alpha$) in the direction of the optical axis L. Further, the first light shielding portion 602 is inclined toward the boundary portion BL from the lower end portion of the region boundary member 132($\alpha$) to reduce the reflection angle of the reflected light of a ray U. Furthermore, the second light shielding portion 604 of the ray incidence-reduction part W is provided on the image side of the filter set 140 to extend from the boundary portion BL along a plane perpendicular to the optical axis L. For example, the second light shielding portion 604 is provided in such a manner that another frame, which is the same as the frame 132, is provided on the image side of the filter set. Since it is possible to prevent a ray U, which is incident from the aperture region 132C, from being incident on the aperture region 132B by the ray incidence-reduction part W that includes the first light shielding portion 602 and the second light shielding portion 604 as described above, it is possible to suppress the occurrence of crosstalk and to suppress the occurrence of flare or a ghost that is caused by the reflected light of the ray U reflected by the first light shielding portion 602. In addition, since the first light shielding portion 602 is inclined and the reflection angle of the reflected light is reduced, the height of the second light shielding portion 604 can be reduced and a reduction in the amount of light can be suppressed.

Figure 29:
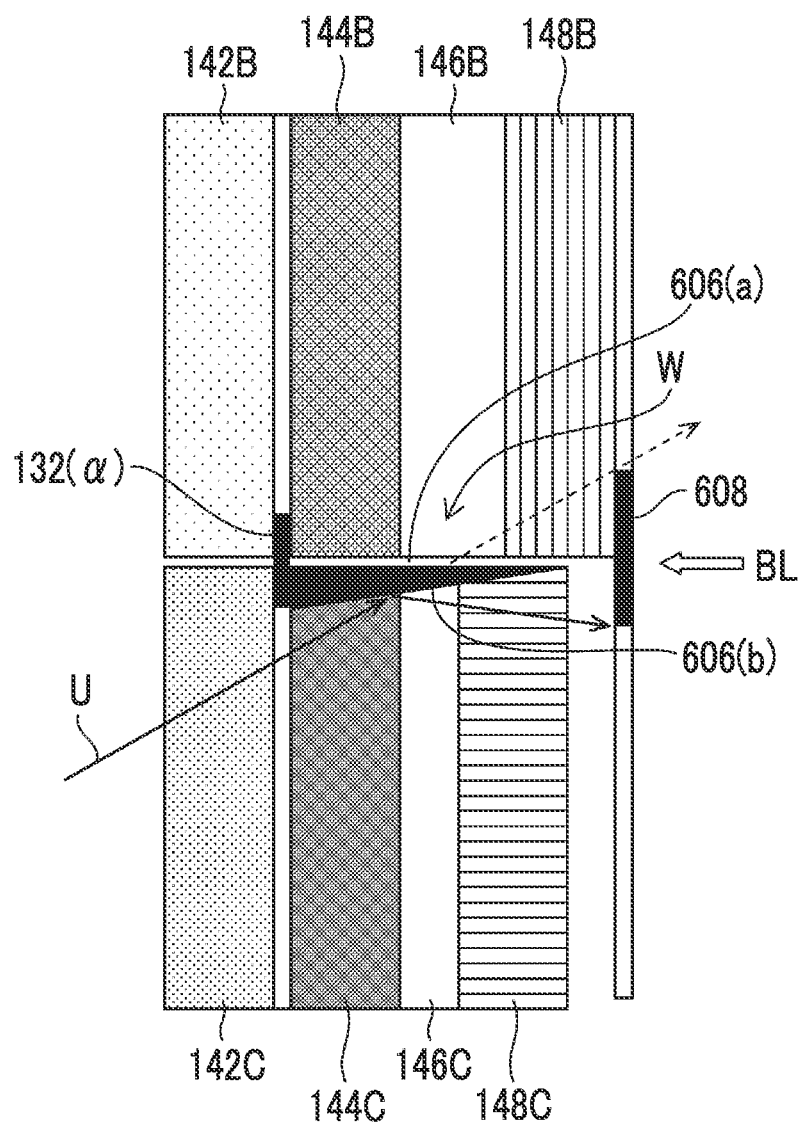
FIG. 29 is a diagram illustrating another example of the fifth embodiment.

FIG. 29 is a diagram illustrating another example of the fifth embodiment.

A first light shielding portion 606 of a ray incidence-reduction part W is provided at the boundary portion BL between the aperture region 132B and the aperture region 132C. The first light shielding portion 606 includes a space 606(a) and a wall member 606(b). The space 606(a) is a space that extends between side surfaces of the filter sets 140B and 140C in the direction of the optical axis L. Further, the wall member 606(b) is inclined to reduce the reflection angle of the reflected light of a ray U. Specifically, the wall member 606(b) has an inclination toward the boundary portion BL from the lower end portion of the region boundary member 132($\alpha$). Furthermore, the second light shielding portion 608 of the ray incidence-reduction part W is provided on the image side of the filter set 140 to extend from the boundary portion BL along a plane perpendicular to the optical axis L. Since it is possible to prevent a ray U, which is incident from the aperture region 132C, from being incident on the aperture region 132B by the ray incidence-reduction part W that includes the first light shielding portion 606 and the second light shielding portion 608 as described above, it is possible to suppress the occurrence of crosstalk and to suppress the occurrence of flare or a ghost that is caused by the reflected light of the ray U reflected by the first light shielding portion 606. In addition, since the first light shielding portion 606 is inclined and the reflection angle of the reflected light is reduced, the height of the second light shielding portion 608 can be reduced and a reduction in the amount of light can be suppressed.

(In the Case of 3×3 Frame)

An example in which the ray incidence-reduction part W of the fifth embodiment is provided in the 3×3 frame 932 (see FIG. 14).

Figure 30:
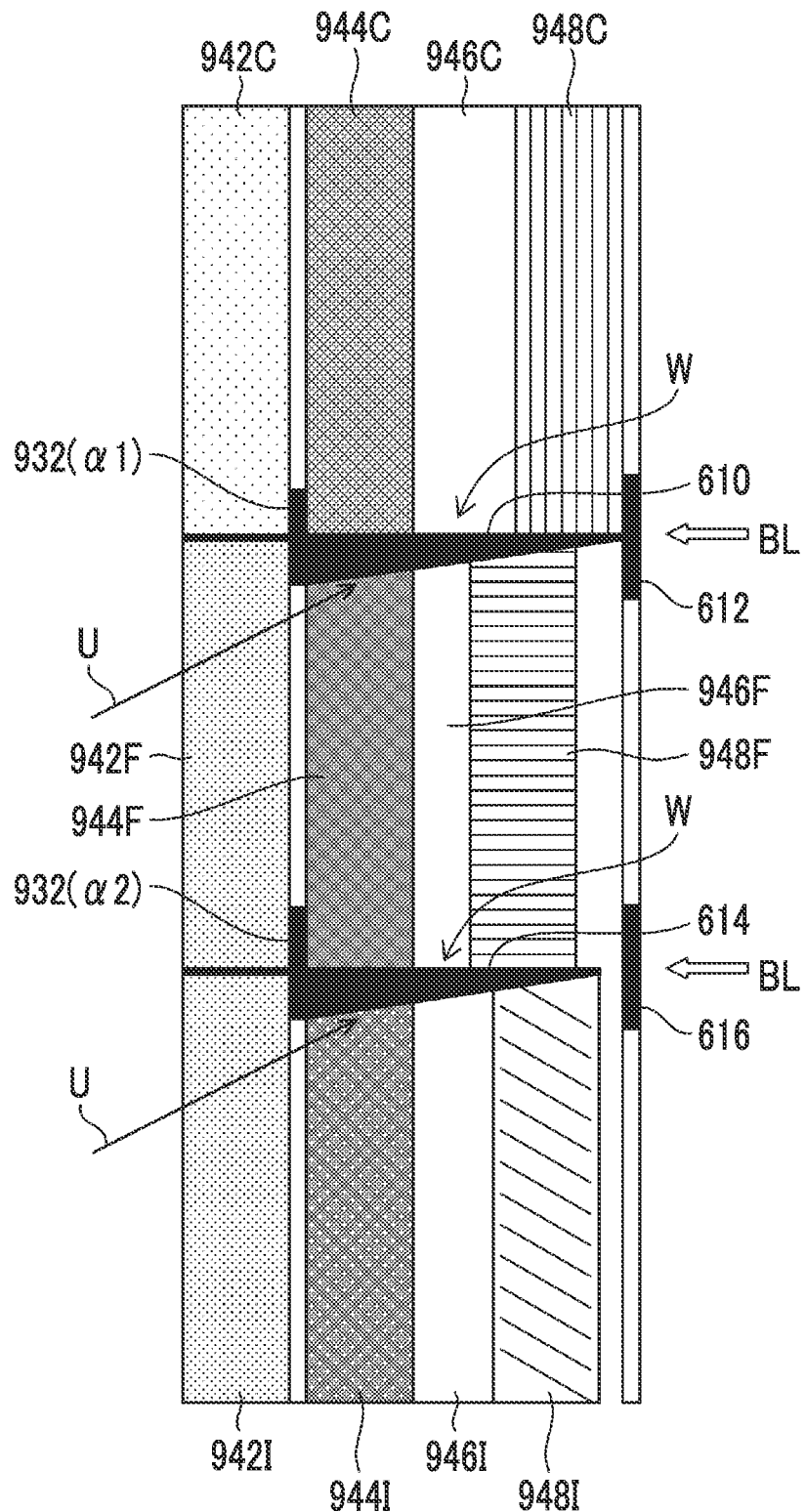
FIG. 30 is a diagram illustrating another example of the fifth embodiment.

FIG. 30 is a diagram illustrating another example of the fifth embodiment.

A first light shielding portion 610 of a ray incidence-reduction part W is provided at the boundary portion BL between the aperture region 932C and the aperture region 932F. Further, a first light shielding portion 614 of a ray incidence-reduction part W is provided at the boundary portion BL between the aperture region 932F and the aperture region 932I. The first light shielding portion 610 and the first light shielding portion 614 are wall members that extend between side surfaces of the filter sets 140B and 140C from the region boundary members 932($\alpha$1, $\alpha$2) in the direction of the optical axis L. Further, the first light shielding portion 610 and the first light shielding portion 614 are inclined toward the boundary portions BL from the lower end portions of the region boundary members 932($\alpha$1) and 932($\alpha$2) to reduce the reflection angle of reflected light of a ray U. Furthermore, a second light shielding portion 612 and a second light shielding portion 616 of the ray incidence-reduction parts W are provided on the image side of the filter sets 140 to extend from the boundary portions BL along a plane perpendicular to the optical axis L. For example, the second light shielding portion 612 and the second light shielding portion 616 are provided in such a manner that other frames, which are the same as the frame 932, are provided on the image side of the filter sets. Since it is possible to prevent a ray U from being incident on the aperture regions other than the aperture region on which the ray U is once incident by the ray incidence-reduction parts W that include the first light shielding portions 610 and 614 and the second light shielding portions 612 and 616 as described above, it is possible to suppress the occurrence of crosstalk and to suppress the occurrence of flare or a ghost that is caused by the reflected light of the ray U reflected by the first light shielding portions 610 and 614. In addition, since the first light shielding portions 610 and 614 are inclined and the reflection angle of the reflected light is reduced, the heights of the second light shielding portions 612 and 616 can be reduced and a reduction in the amount of light can be suppressed.

Sixth Embodiment

A sixth embodiment of the optical member 130 will be described. A ray incidence-reduction part W of the present embodiment is formed of a region boundary member 132($\alpha$) of which the height is appropriately set.

Figure 31:
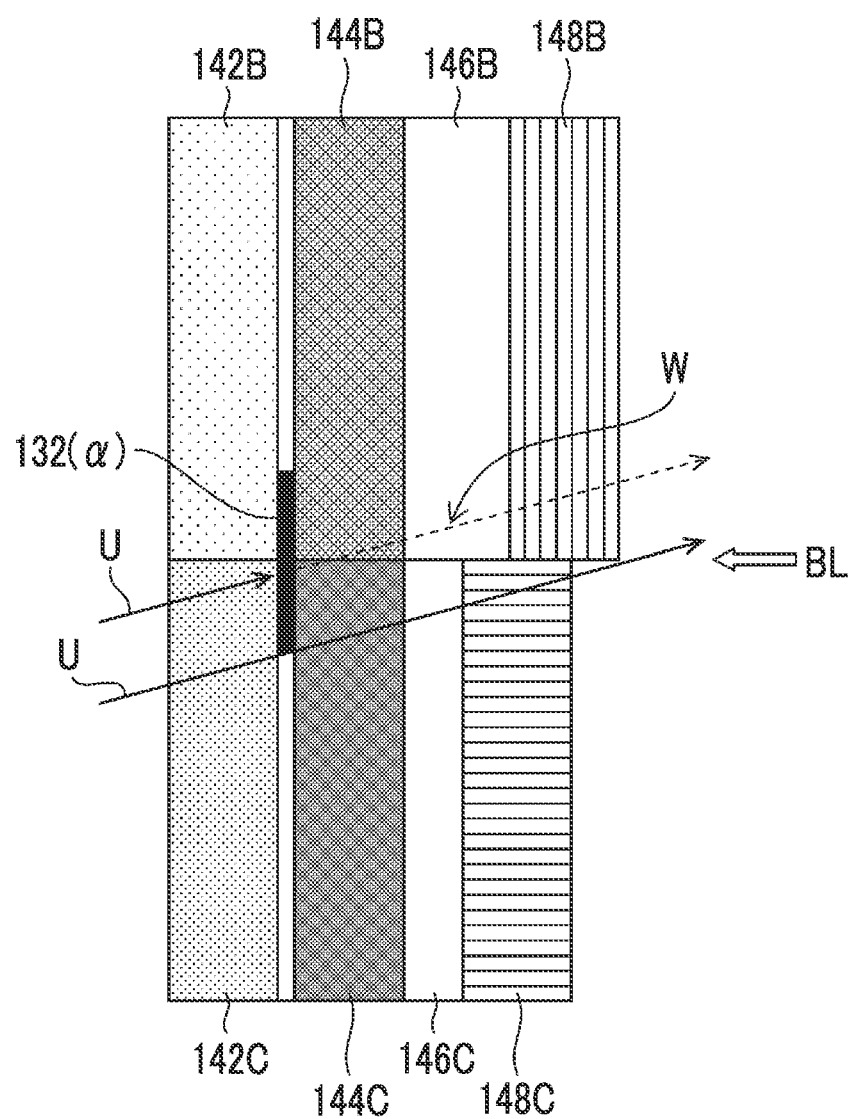
FIG. 31 is a diagram illustrating a ray incidence-reduction part W of a sixth embodiment.

FIG. 31 is a diagram illustrating the ray incidence-reduction part W of the sixth embodiment.

The region boundary member 132($\alpha$) of which the height is appropriately set is provided as the ray incidence-reduction part W. The region boundary member 132($\alpha$) is provided on the surfaces of the optical filters 144B and 144C facing the object side. Since the height of the region boundary member 132($\alpha$) is appropriately set as described above, it is possible to prevent or reduce the incidence of a ray U, which is transmitted through the optical filter 144C, on the aperture region 132B. Accordingly, it is possible to suppress the occurrence of crosstalk.

Figure 32:
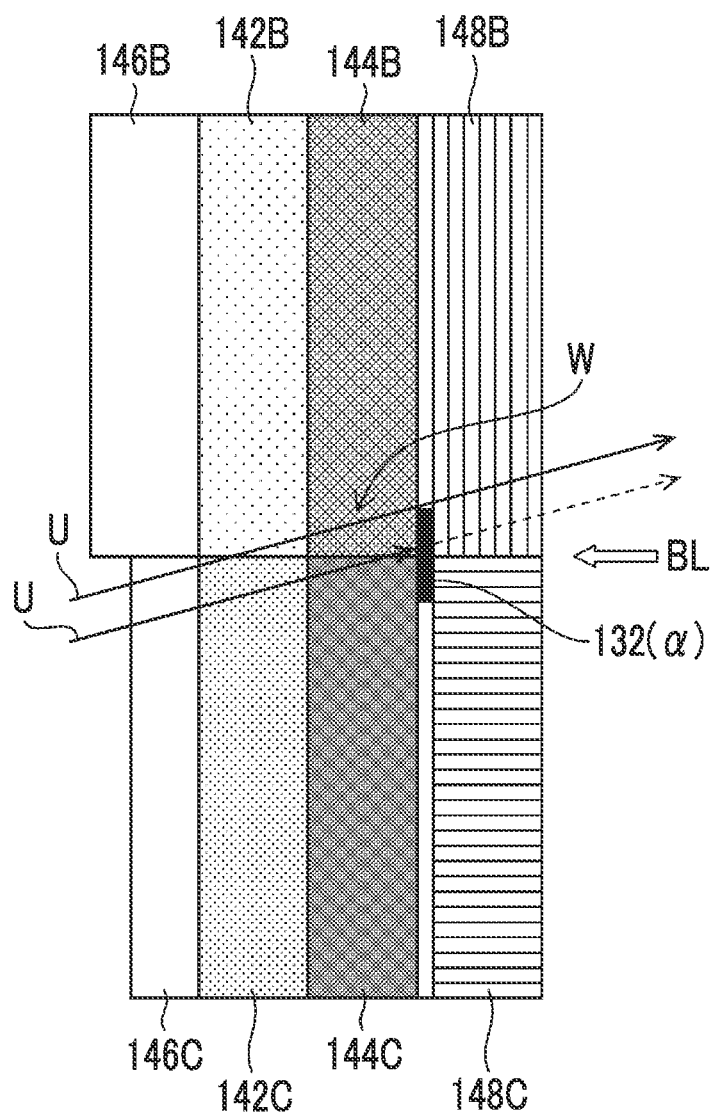
FIG. 32 is a diagram illustrating another example of the sixth embodiment.
Figure 33:
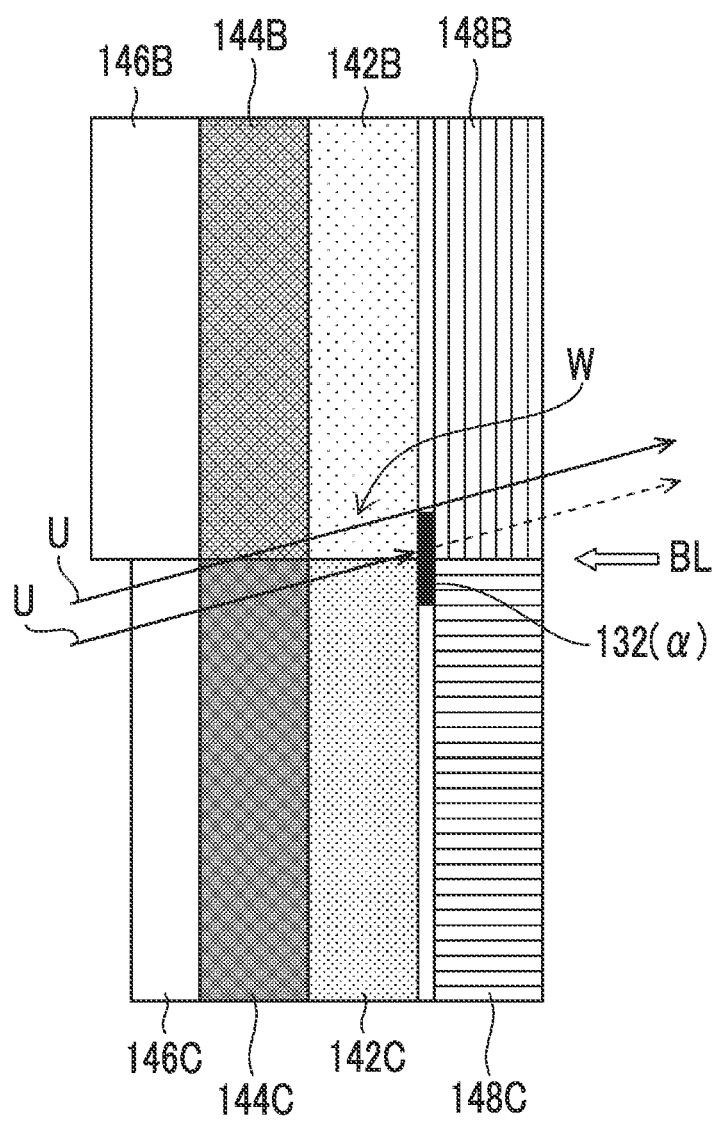
FIG. 33 is a diagram illustrating a reference example of the sixth embodiment.
Figure 34:
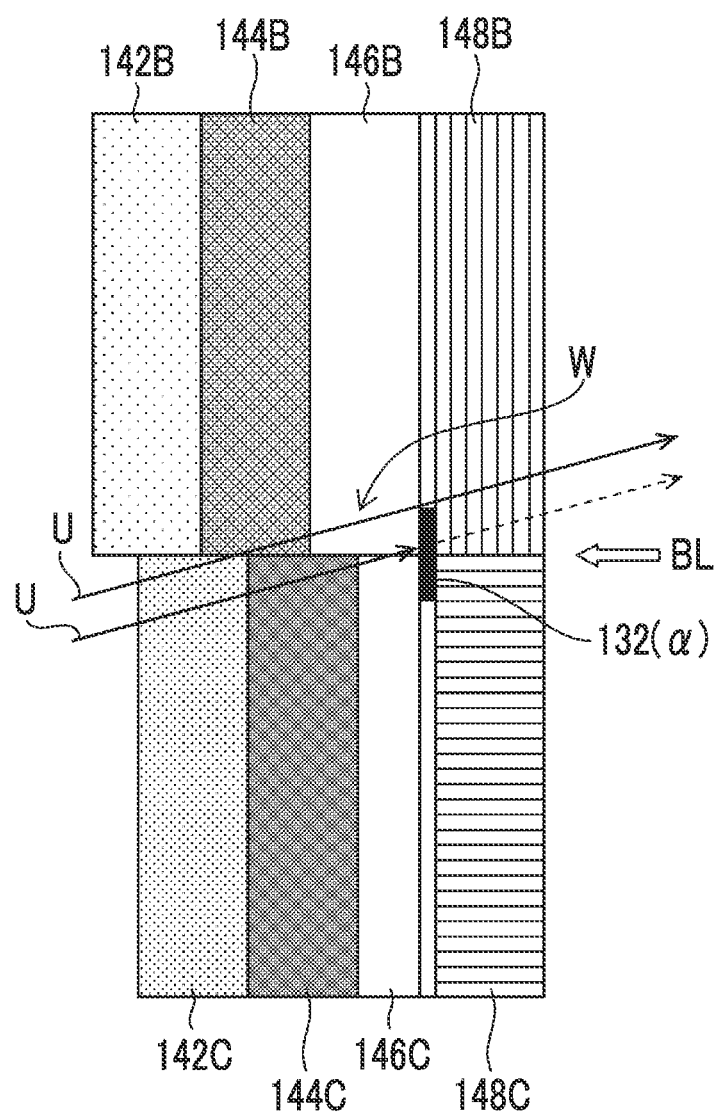
FIG. 34 is a diagram illustrating a reference example of the sixth embodiment.

FIG. 32 is a diagram illustrating another example of the sixth embodiment, and FIGS. 33 and 34 are diagrams illustrating reference examples of the sixth embodiment.

In the example shown in FIG. 32, an optical path length-correcting filter 146B, an ND filter 142B, an optical filter 144B, and a polarizing filter 148B are arranged in a filter set 140B in order. Further, filters are also arranged in a filter set 140C in the same order as the filter set 140B. The optical filter 144B and the polarizing filter 148B are provided in close contact with each other, and the optical filter 144C and the polarizing filter 148C are provided in close contact with each other. Here, "close contact" means that the filters are in close contact with each other, and means a case where the filters are close contact with each other even though a region boundary member 132(α) is provided between the filters. Light transmitted through the optical filters 144B and 144C and the polarizing filters 148B and 148C relatively significantly affects the quality of an image to be obtained and spectral accuracy. Accordingly, the region boundary member 132(α) of which the height is appropriately set is provided between the optical filters 144B and 144C and the polarizing filters 148B and 148C to suppress the occurrence of crosstalk between the optical filters 144B and 144C and the polarizing filters 148B and 148C. Since the height of the region boundary member 132(α) is appropriately set and the region boundary member 132(α) is provided between the optical filters 144B and 144C and the polarizing filters 148B and 148C as described above, it is possible to prevent or reduce the incidence of a ray U, which is transmitted through the optical filter 144C, on the aperture region 132B. Accordingly, it is possible to suppress the occurrence of crosstalk.

In the example shown in FIG. 33, an optical path length-correcting filter 146B, an optical filter 144B, an ND filter 142B, and a polarizing filter 148B are arranged in a filter set 140B in order. Further, filters are also arranged in a filter set 140C in the same order as the filter set 140B. The region boundary member 132(α) is disposed between the ND filter 142B (142C) and the polarizing filter 148B (148C). Accordingly, since it is possible to prevent or reduce the incidence of a ray U, which is transmitted through the ND filter 142B, on the polarizing filter 148C or the incidence of a ray U, which is transmitted through the ND filter 142C, on the polarizing filter 148B, it is possible to suppress the occurrence of crosstalk.

In the example shown in FIG. 34, an ND filter 142B, an optical filter 144B, an optical path length-correcting filter 146B, and a polarizing filter 148B are arranged in a filter set 140B in order. Further, an ND filter 142C, an optical filter 144C, an optical path length-correcting filter 146C, and a polarizing filter 148C are arranged in a filter set 140C in order. In this case, the region boundary member 132(α) is disposed between the optical path length-correcting filter 146B (146C) and the polarizing filter 148B (148C). Accordingly, since it is possible to prevent or reduce the incidence of a ray U, which is transmitted through the optical path length-correcting filter 146C, on the polarizing filter 148B or the incidence of a ray U, which is transmitted through the optical path length-correcting filter 146B, on the polarizing filter 148C, it is possible to suppress the occurrence of crosstalk.

Figure 35:
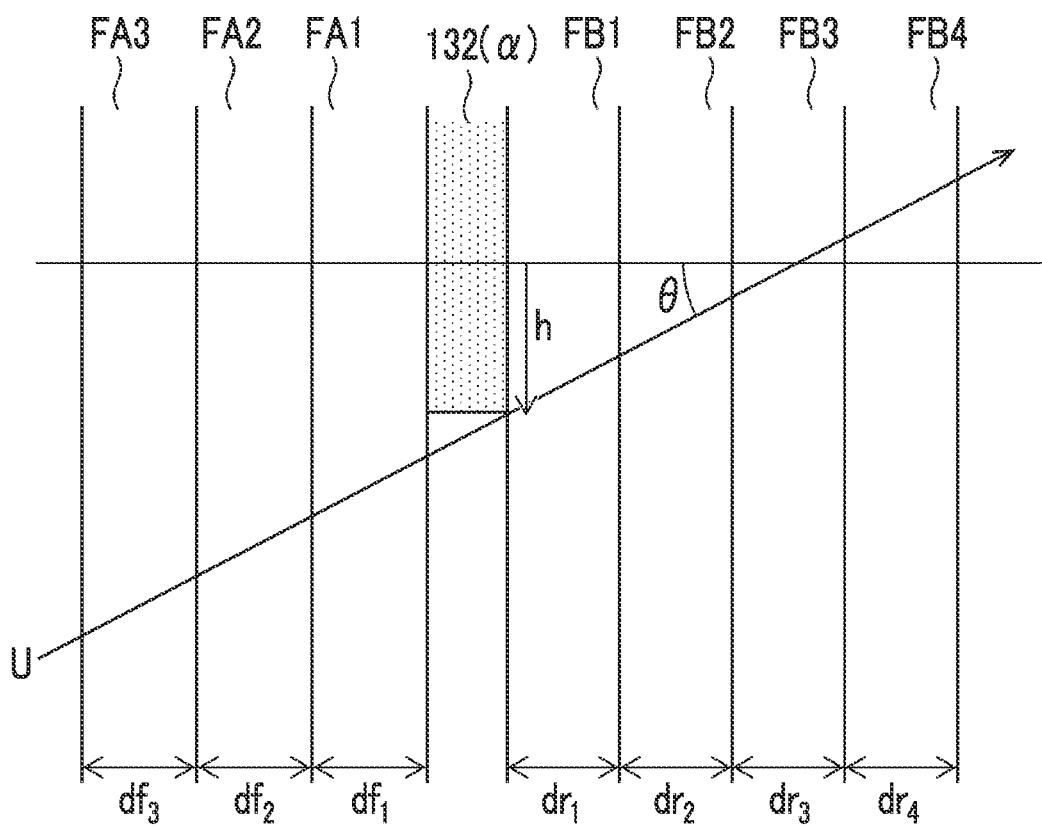
FIG. 35 is a diagram illustrating a method of calculating a height of a region boundary member of the sixth embodiment.

FIG. 35 is a diagram illustrating a method of calculating a height of the region boundary member 132(α) of the sixth embodiment.

In an example shown in FIG. 35, a filter set includes filters FA1 to FA3 and filters FB1 to FB4. The filters FA1 to FA3 are arranged on the object side of the region boundary member 132(α), and the filters FB1 to FB4 are arranged on the image side of the region boundary member 132(α).

A case where crosstalk between (the filter FA1) and (the filters FB1 and FB2) is suppressed is will be considered in the following description. A filter thickness on the object side of the region boundary member 132(α) is df1 corresponding to the filter FA1. Further, a filter thickness on the image side of the region boundary member 132(α) is dr1+dr2 corresponding to the filters FB1 and FB2. In this case, assuming that the height of the region boundary member 132(α) to be set is denoted by h, h is set to satisfy the condition of the following expression (6).

$$h > d \tan(\theta + \varepsilon) \tag{6}$$

As shown in the following expression (7), d is a larger value of df1 and dr1+dr2.

$$d = \max\left(\sum_{i=1}^{m} df_i, \sum_{j=1}^{n} dr_j\right) \tag{7}$$

Further, a ray angle θ (rad), a fall ε (rad) of the frame 132, and filters 1 to m and 1 to n for preventing rays from being mixed are represented in Expressions (6) and (7).

The ray angle θ (rad) in Expression (6) corresponds to the case of the 2×2 frame 132, and a ray angle θ (rad) at the height of the frame is applied in the case of the 3×3 frame 932.

Seventh Embodiment

A seventh embodiment of the optical member 130 will be described. A ray incidence-reduction part W of the present embodiment includes a plurality of region boundary members 132(α) that are provided between optical filters 144B and 144C and polarizing filters 148B and 148C separated from each other.

Figure 36:
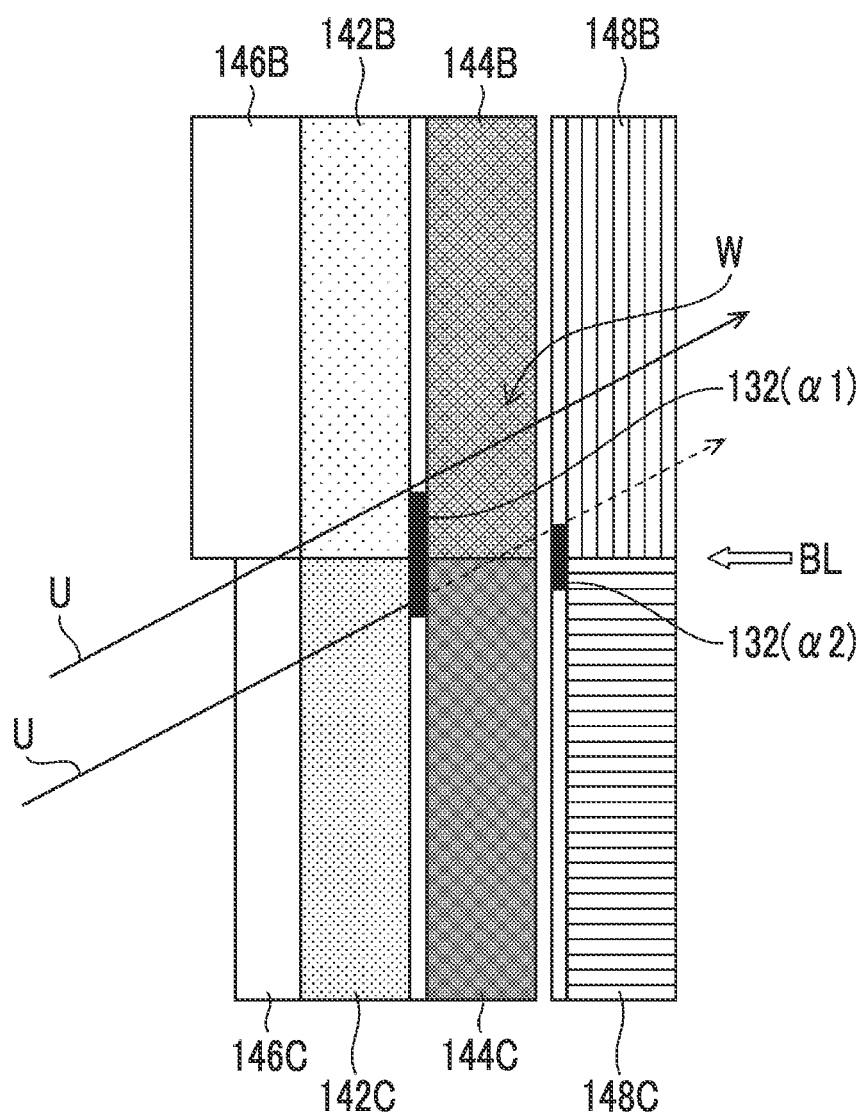
FIG. 36 is a diagram illustrating a ray incidence-reduction part W of a seventh embodiment.

FIG. 36 is a diagram illustrating the ray incidence-reduction part W of the seventh embodiment.

The ray incidence-reduction part W includes two region boundary members, that is, a region boundary member 132(α1) and a region boundary member 132(α2) that are provided at boundary portions BL. The region boundary member 132(α1) is provided between ND filters 142B and 142C and optical filters 144B and 144C. Further, the region boundary member 132(α2) is provided between optical filters 144B and 144C and polarizing filters 148B and 148C. Accordingly, since it is possible to prevent or reduce the incidence of a ray U, which is transmitted through the optical filter 144C, on the polarizing filter 148B, it is possible to suppress the occurrence of crosstalk. The heights of the region boundary member 132(α1) and the region boundary member 132(α2) are set on the basis of the falls of the respective filters, axis deviations, and an interval between the filters (details will be described later).

Figure 37:
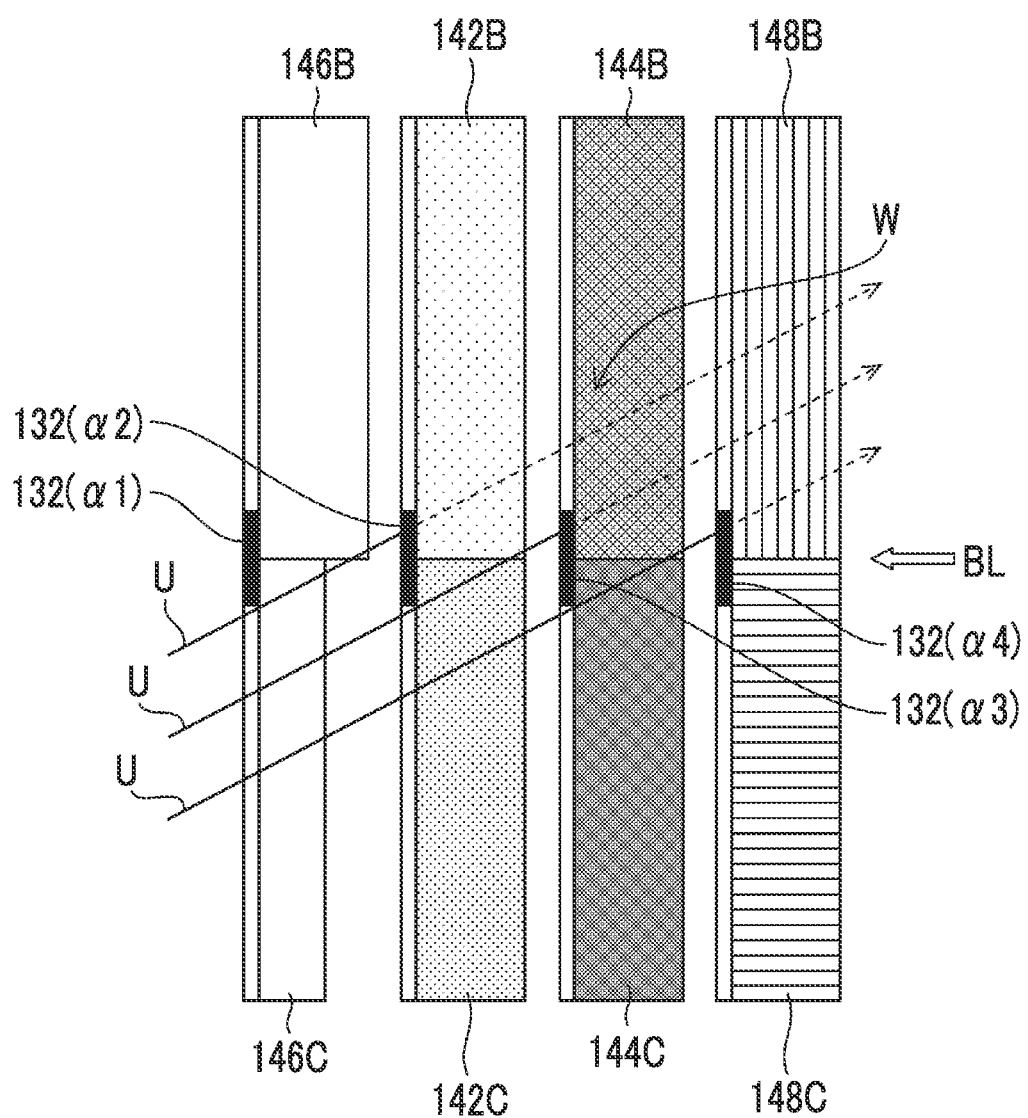
FIG. 37 is a diagram illustrating another example of the seventh embodiment.

FIG. 37 is a diagram illustrating another example of the seventh embodiment.

A ray incidence-reduction part W includes four region boundary members 132(α1) to 132(α4) that are provided at boundary portions BL. The region boundary member 132(α1) is provided on the surfaces of the optical path length-correcting filters 146B and 146C facing the object side. The region boundary member 132(α2) is provided on the surfaces of the ND filters 142B and 142C facing the object side. The region boundary member 132(α3) is provided on the surfaces of the optical filters 144B and 144C facing the object side. The region boundary member 132(α4) is provided on the surfaces of the polarizing filters 148B and 148C facing the object side. Accordingly, since it is possible to prevent or reduce the incidence of a ray U on the aperture region 132B from the aperture region 132C, it is possible to suppress the occurrence of crosstalk. The heights of the region boundary members 132(α1) to 132(α4) are set on the basis of the falls of the respective filters, axis deviations, and an interval between the filters (details will be described later).

(In the Case of 3×3 Frame)

An example in which the ray incidence-reduction part W of the seventh embodiment is provided in the 3×3 frame 932 (see FIG. 14).

Figure 38:
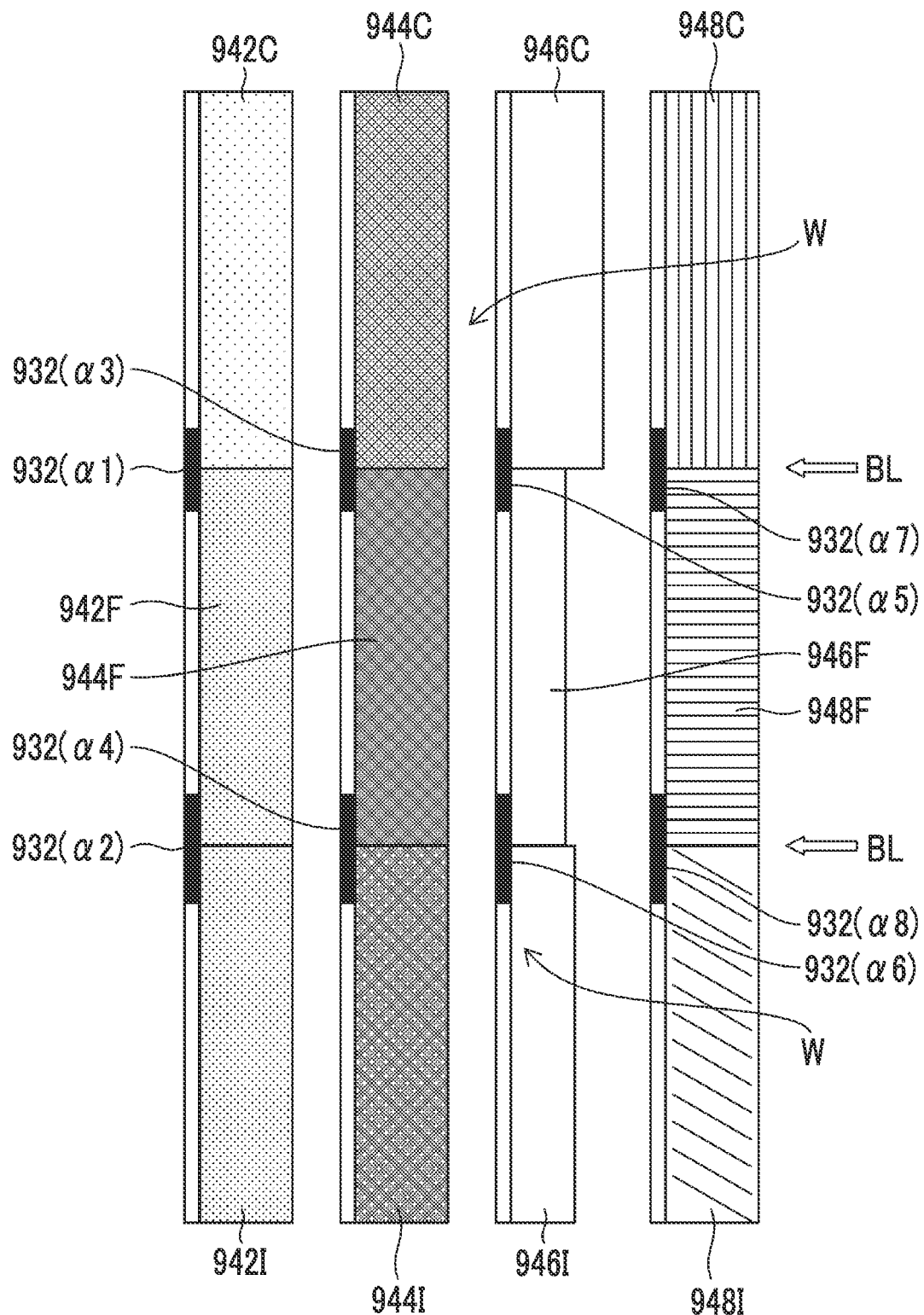
FIG. 38 is a diagram illustrating another example of the seventh embodiment.

FIG. 38 is a diagram illustrating another example of the seventh embodiment.

A ray incidence-reduction part W is formed of eight region boundary members 932(α1) to 932(α8). The eight region boundary members 932(α1) to 932(α8) are provided in pairs at the boundary portions BL on the object side of each filter. Specifically, the region boundary member 932(α1) and the region boundary member 932(α2) are provided at the respective boundary portions BL between the ND filters (942C, 942F, and 942I). Further, the region boundary member 932(α3) and the region boundary member 932(α4) are provided at the respective boundary portions BL between the optical filters (944C, 944F, and 944I). Furthermore, the region boundary member 932(α5) and the region boundary member 932(α6) are provided at the respective boundary portions BL between the optical path length-correcting filters (946C, 946F, and 946I). In addition, the region boundary member 932(α7) and the region boundary member 932(α8) are provided at the respective boundary portions BL between the polarizing filters (948C, 948F, and 948I). Accordingly, since it is possible to prevent or reduce the incidence of an obliquely incident ray U (not shown in FIG. 38) on regions other than the aperture region on which the ray U is once incident, it is possible to suppress the occurrence of crosstalk.

The ray incidence-reduction part W is formed of a plurality of region boundary members 132(α) in the above-mentioned example, but the present embodiment is not limited thereto. For example, the ray incidence-reduction part W may be formed of the wall member that is provided along the optical axis L at the boundary portion BL as described in the above-mentioned first embodiment. Further, the ray incidence-reduction part W may be formed of a combination of the wall member that is provided along the optical axis L at the boundary portion BL as described in the above-mentioned first embodiment and the region boundary member 132(α) that is described in the present embodiment.

Figure 39:
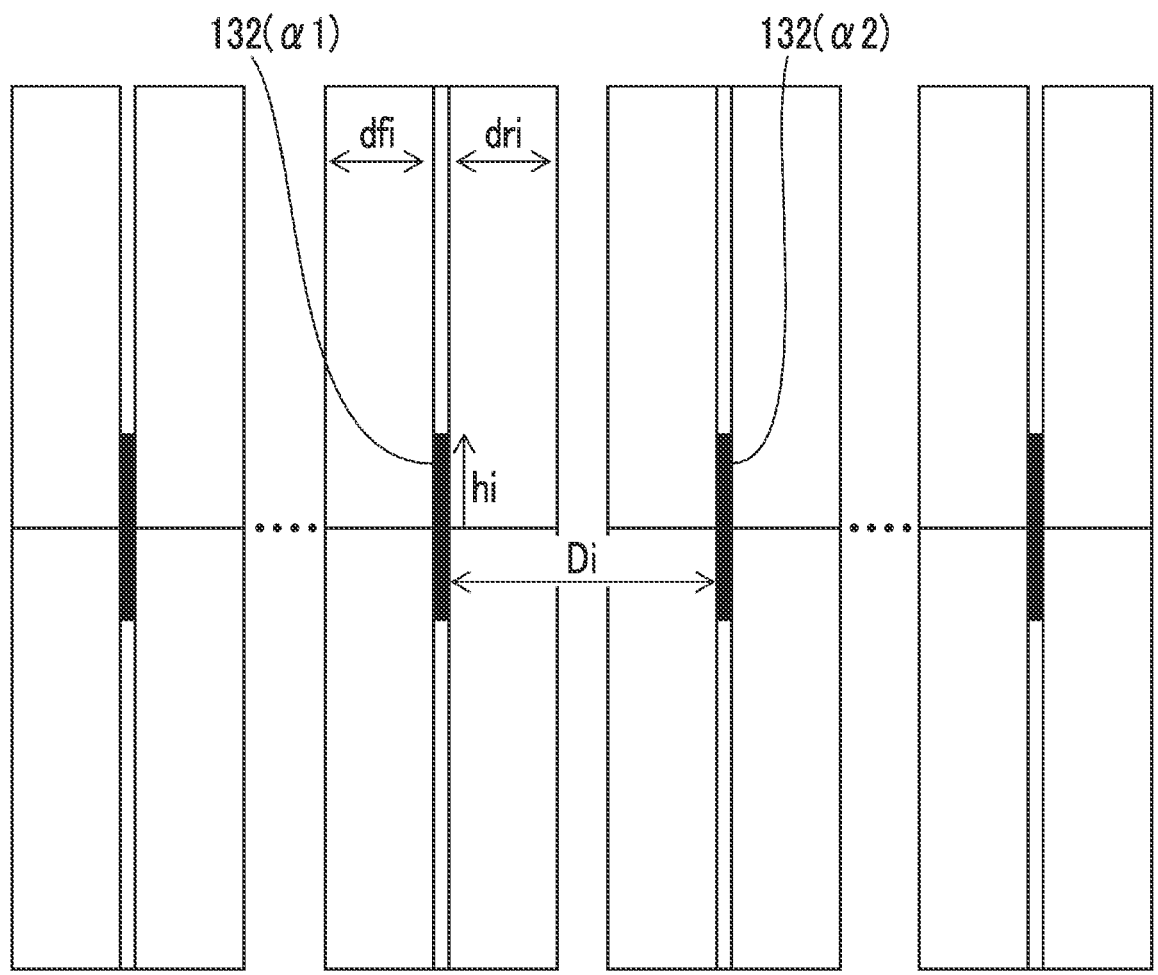
FIG. 39 is a diagram illustrating an expression relating to a height of a region boundary member of the seventh embodiment.
Figure 40:
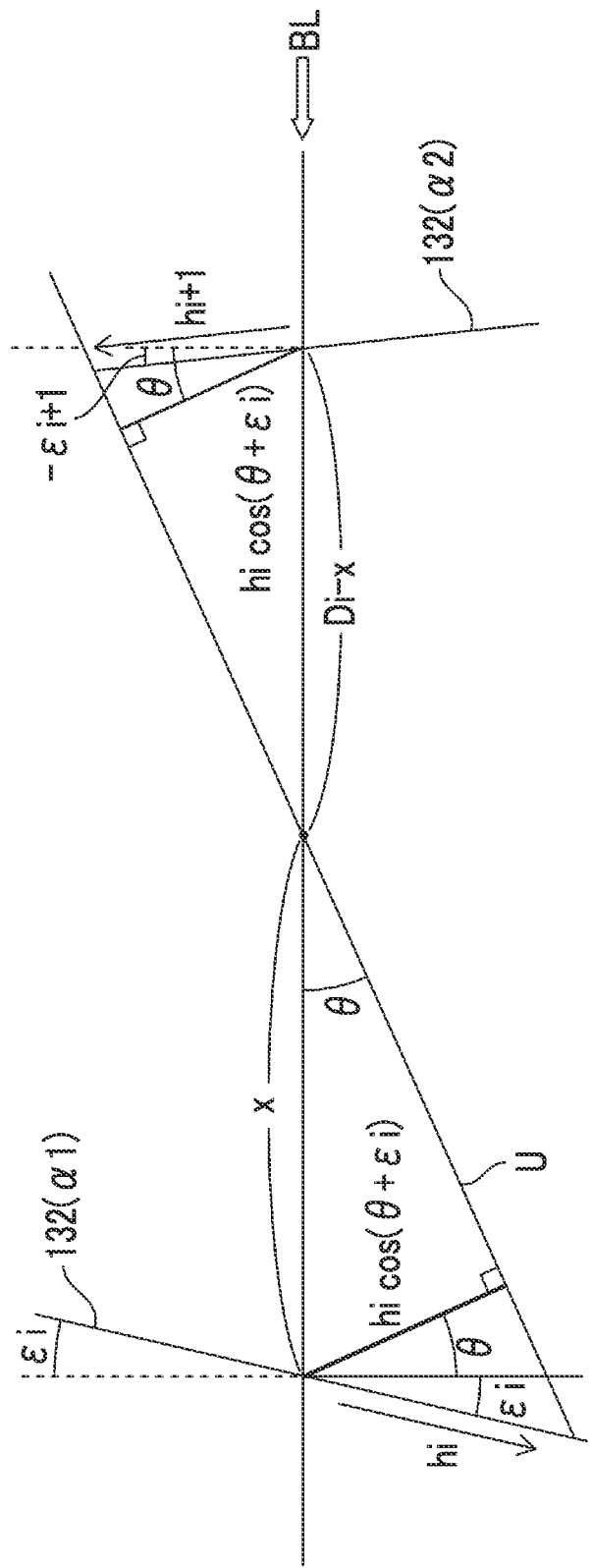
FIG. 40 is a diagram illustrating an expression relating to the height of the region boundary member of the seventh embodiment.

FIGS. 39 and 40 are diagrams illustrating an expression relating to the height of the region boundary member of the seventh embodiment.

In a case where a height hi of a region boundary member 132(α1) is to be set so that the region boundary member 132(α1) does not allow a ray U to cross the boundary portion BL as shown in FIG. 39, it is necessary to satisfy the following expression (8).

$$h_i > d_{imax} \tan(\theta + \varepsilon_i) \quad (8)$$

$$d_{imax} = \max(df_i, dr_i) \quad (9)$$

The respective values in Expressions (8) and (9) are as follows.

A ray angle is denoted by θ (rad).

An inclination of the frame 132 of the region boundary member 132(α1) is denoted by εi (rad).

The thickness of a filter on the object side of the region boundary member 132(α1) is denoted by dfi.

The thickness of a filter on the image side of the region boundary member 132(α1) is denoted by dri.

In a case where a ray U crosses the boundary portion BL and is then blocked by the region boundary member 132(α2) as shown in FIG. 40, a height hi of the region boundary member 132(α1) and a height hi+1 of the region boundary member 132(α2) need to satisfy the following expression (10).

$$h_i \cos(\theta + \varepsilon_i) + h_{i+1} \cos(\theta + \varepsilon_{i+1}) > D_i \sin(\theta) + \frac{x_i - x_{i+1}}{\cos(\theta)} \quad (10)$$

The respective values in Expression (10) are as follows.

A ray angle is denoted by θ (rad).

An inclination of the frame 132 of the region boundary member 132(α1) is denoted by εi (rad).

An inclination of the frame 132 of the region boundary member 132(α2) is denoted by εi+1 (rad).

A distance between the region boundary member 132(α1) and the region boundary member 132(α2) is denoted by Di.

An axis deviation of the frame 132 of the region boundary member 132(α1) is denoted by xi (rad).

An axis deviation of the frame 132 of the region boundary member 132(α2) is denoted by xi+1 (rad).

As described above, the heights of the region boundary member 132(α1) and the region boundary member 132(α2) are set in the present embodiment such that Expression (8) or (10) are satisfied.

Eighth Embodiment

An eighth embodiment of the optical member 130 will be described. A ray incidence-reduction part W of the present embodiment is provided on an optical filter of which a surface facing the object side and a surface facing the image side transmit different wavelength ranges.

FIG. 41 is a diagram illustrating the ray incidence-reduction part W of the eighth embodiment.

An optical filter 144(W) includes a surface 820(W1) (first surface) on the object side of the aperture region 132B and a surface 820(W3) (second surface) on the image side thereof. The wavelength transmission characteristics (first wavelength range) of the surface 820(W1) are shown in a graph 802, and the wavelength transmission characteristics (second wavelength range) of the surface 820(W3) are shown in a graph 806. Further, the optical filter 144(W) includes a surface 820(W2) (third surface) on the object side of the aperture region 132C and a surface 820(W4) (fourth surface) on the image side thereof. The wavelength transmission characteristics (third wavelength range) of the surface 820(W2) are shown in a graph 804, and the wavelength transmission characteristics (fourth wavelength range) of the surface 820(W4) are shown in a graph 808. As shown in the graphs 802 to 808, in the optical filter 144(W), the surfaces 820(W1) and 820(W2) facing the object side include short wavelength-side cut surfaces and the surfaces 820(W3) and 820(W4) facing the image side include long wavelength-side cut surfaces. Further, wavelength characteristics of rays V1 to V4 transmitted through the optical filter 144(W) are shown in graphs 810 to 816. The ray V1 is an obliquely incident ray, and is blocked since a wavelength is cut in the entire range by the surface 820(W2) and the surface 820

(W3) as shown in the graph 810. Light of the ray V2 having a predetermined wavelength range a1 is transmitted through the surface 820(W1) and the surface 820(W3) as shown in the graph 812. Light of the ray V3 having a predetermined wavelength range a2 is transmitted through the surface 820(W2) and the surface 820(W4) as shown in the graph 814. The wavelength ranges a1 and a2 are ranges that are intended by a designer. The ray V4 is an obliquely incident ray, and light of the ray V4 having a wavelength range A is transmitted as shown in the graph 816. In the wavelength range A, a wavelength is not appropriately cut without intended design. Accordingly, a region boundary member 132(α) is provided to block the ray V4. Specifically, the region boundary member 132(α) is provided near a boundary portion BL of the surface 820(W4). Accordingly, the ray V4 can be appropriately killed. Since the region boundary member 132(α) is provided, the aperture region is reduced. However, it is possible to invert the object side and the image side of the optical filter 144(W) or to change which surface of the surfaces of the optical filter 144(W) facing the object side and the image side the region boundary member 132(α) is provided on.

The embodiments of the present invention have been described above, but it goes without saying that the present invention is not limited to the above-mentioned embodiments and may have various modifications without departing from the scope of the present invention.

EXPLANATION OF REFERENCES

10: imaging apparatus
100: lens device
100A: optical system
102: lens barrel
108: slit
110: first lens
120: second lens
130: optical member
132: frame
132A: aperture region
132B: aperture region
132C: aperture region
132D: aperture region
140: filter set
140A: filter set
140B: filter set
140C: filter set
142A: ND filter
142B: ND filter
142C: ND filter
144A: optical filter
144B: optical filter
144C: optical filter
146A: optical path length-correcting filter
146B: optical path length-correcting filter
146C: optical path length-correcting filter
148A: polarizing filter
148B: polarizing filter
148C: polarizing filter
200: imaging apparatus body
210: imaging element
211: pixel array layer
212: photodiode
213: polarizing filter element-array layer
214A: polarizing filter element
214B: polarizing filter element
214C: polarizing filter element
214D: polarizing filter element
215: microlens array layer
216: microlens
230: signal processing unit
232: analog signal processing unit
234: image generation unit
236: coefficient storage unit
L: optical axis
U: ray

What is claimed is:

1. An optical member comprising:
a plurality of aperture regions which transmit a ray of an optical system and include a first aperture region and a second aperture region and of which the first aperture region and the second aperture region are adjacent to each other;
a plurality of optical filters that are disposed in the first aperture region and the second aperture region and transmit light having at least a part of wavelength ranges different from each other;
a plurality of polarizing filters that are disposed in the first aperture region and the second aperture region and have polarization directions different from each other; and
a ray incidence-reduction part that reduces incidence of a ray, which is incident on the first aperture region, on at least one of the optical filter or the polarizing filter disposed in the second aperture region,
wherein the optical filters are provided with a first surface transmitting a first wavelength range on an object side of the optical system and a second surface transmitting a second wavelength range on an image side of the optical system in the first aperture region, and is provided with a third surface transmitting a third wavelength range on the object side of the optical system and a fourth surface transmitting a fourth wavelength range on the image side of the optical system in the second aperture region, and
the ray incidence-reduction part is disposed on the fourth surface in a case where an overlapping range between the first wavelength range and the fourth wavelength range is equal to or larger than a predetermined wavelength range A.

2. The optical member according to claim 1,
wherein the ray incidence-reduction part is provided at a boundary portion between the first aperture region and the second aperture region and extends in a direction of an optical axis of the optical system.

3. The optical member according to claim 2,
wherein the ray incidence-reduction part reflects a ray.

4. The optical member according to claim 2,
wherein the ray incidence-reduction part guides reflected light to the object side of the optical system.

5. The optical member according to claim 1,
wherein the ray incidence-reduction part includes a first light shielding portion that is provided at a boundary portion between the first aperture region and the second aperture region and extends in a direction of an optical axis of the optical system, and a second light shielding portion that extends from the boundary portion in a direction along a plane perpendicular to the optical axis.

6. The optical member according to claim 5,
wherein the first light shielding portion has an inclination that reduces a reflection angle of reflected light.

7. The optical member according to claim 1,
wherein the ray incidence-reduction part is provided to extend from a boundary portion between the first aperture region and the second aperture region in a direction along a plane perpendicular to an optical axis of the optical system.

8. The optical member according to claim 7,
wherein the ray incidence-reduction part is provided on a surface of the optical filters or the polarization filters facing the object side.

9. The optical member according to claim 7,
wherein the ray incidence-reduction part is provided on a surface of the optical filters or the polarization filters facing the image side.

10. The optical member according to claim 1,
wherein the optical filters and the polarization filters are provided in close contact with each other.

11. The optical member according to claim 1,
wherein the optical filters and the polarizing filters are provided to be separated from each other, and the ray incidence-reduction part is provided between the optical filters and the polarizing filters to extend in a direction along a plane perpendicular to an optical axis of the optical system and/or in a direction along the optical axis.

12. An imaging apparatus comprising:
a lens device in which the optical member according to claim 1 is disposed at a pupil position or near the pupil position;
a plurality of polarizers that have polarization directions corresponding to the polarization directions of the plurality of polarizing filters;
an imaging element that includes a plurality of pixel groups selectively receiving light passing through any of the plurality of aperture regions, and
a processor that generates a plurality of images corresponding to the wavelength ranges of the plurality of optical filters, respectively, on the basis of a plurality of image signals output from the imaging element.

* * * * *